(12) United States Patent
Lasser et al.

(10) Patent No.: US 8,407,399 B2
(45) Date of Patent: Mar. 26, 2013

(54) METHOD AND APPARATUS FOR ENFORCING A FLASH MEMORY CACHING POLICY

(75) Inventors: Menahem Lasser, Kochav Yair (IL); Itshak Afriat, Tel-Mond (IL); Opher Lieber, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 677 days.

(21) Appl. No.: 12/260,135

(22) Filed: Oct. 29, 2008

(65) Prior Publication Data

US 2010/0106890 A1   Apr. 29, 2010

(51) Int. Cl.
*G06F 12/08* (2006.01)
(52) U.S. Cl. ........ 711/103; 711/113; 711/118; 711/138; 711/170; 711/173
(58) Field of Classification Search ........................ None
See application file for complete search history.

(56) References Cited

U.S. PATENT DOCUMENTS

| | | | |
|---|---|---|---|
| 5,930,167 A * | 7/1999 | Lee et al. | 365/185.03 |
| 2006/0168390 A1 | 7/2006 | Speier et al. | 711/5 |
| 2007/0061502 A1 | 3/2007 | Lasser et al. | 711/103 |
| 2008/0016283 A1 | 1/2008 | Madter | 711/138 |
| 2008/0189478 A1* | 8/2008 | Chae et al. | 711/103 |
| 2008/0209112 A1* | 8/2008 | Yu et al. | 711/103 |
| 2008/0209114 A1* | 8/2008 | Chow et al. | 711/103 |
| 2009/0089482 A1 | 4/2009 | Traister | 711/103 |

* cited by examiner

*Primary Examiner* — Jared Rutz
*Assistant Examiner* — Alan Otto
(74) *Attorney, Agent, or Firm* — Martine Penilla Group, LLP.

(57) ABSTRACT

Methods, apparatus and computer medium for enforcing one or more cache management policies are disclosed herein. In some embodiments, a flash memory of a storage device includes a plurality of flash memory dies each flash memory die including a respective cache storage area and a respective main storage area. A determination is made, for data that is received from an external host device to which main storage area the received data is addressed thereby specifying one of the plurality of flash memory dies as a target die for the received data. Whenever the received data is written into a cache storage area before being written into a main storage area, the received data is written into the cache storage area of the specified target die.

28 Claims, 20 Drawing Sheets

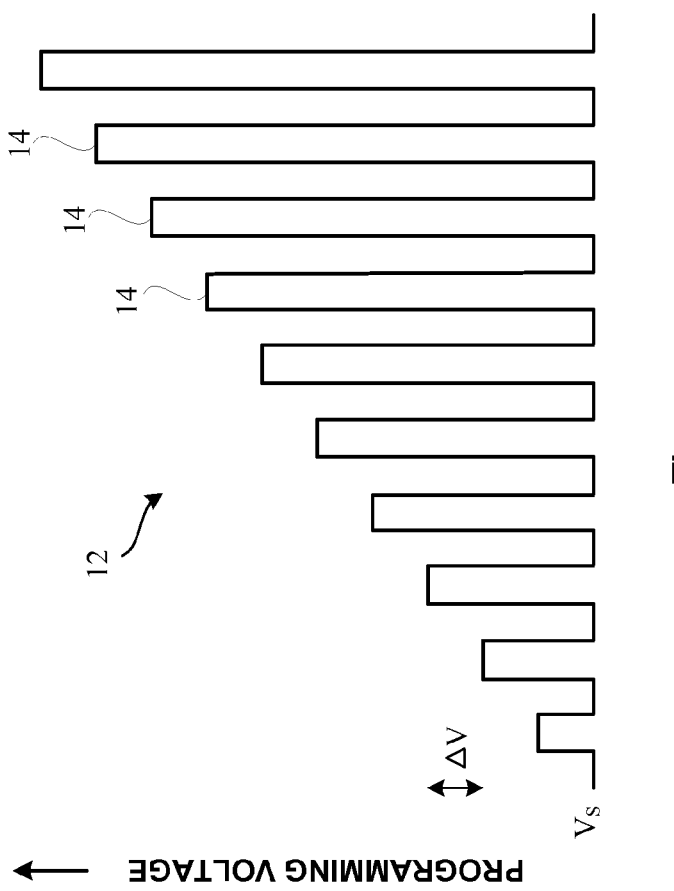

METHOD AND APPARATUS FOR ENFORCING A FLASH MEMORY CACHING POLICY

FIELD OF THE INVENTION

The present invention relates to flash memory devices, and in particular to flash memory devices that are operative to enforce one or more flash cache management policies.

BACKGROUND AND RELATED ART

Single Bit and Multi-Bit Flash Memory Cells

Flash memory devices have been known for many years. In many "traditional" flash memory devices, each memory cell within a flash memory device stores one bit of information. Thus, the traditional way to store a bit in a flash memory cell has been by supporting two states of the memory cell. One state represents a logical "0" and the other state represents a logical "1".

In a flash memory cell, the two states are implemented by having a floating gate situated above the cell's channel (the area connecting the source and drain elements of the cell's transistor), and having two valid states for the amount of charge stored within the floating gate. Typically, one state is with zero charge in the floating gate and is the unwritten state of the cell after being erased (commonly defined to represent the "1" state) and the other state is with some amount of negative charge in the floating gate (commonly defined to represent the "0" state). Having negative charge in the gate causes the threshold voltage of the cell's transistor (i.e. the voltage that has to be applied to the transistors control gate in order to cause the transistor to conduct) to increase. It is possible to read the stored bit by checking the threshold voltage of the cell. If the threshold voltage is in the higher state then the bit value is "0" and if the threshold voltage is in the lower state then the bit value is "1". Actually there is no need to accurately read the cell's threshold voltage. All that is needed is to correctly identify in which of the two states the cell is currently located. For this purpose it is sufficient to compare the threshold voltage of the cell to a reference voltage that is between the two states, and to determine if the cell's threshold voltage is below or above the reference value.

FIG. 1A (prior art) shows graphically how this works. Specifically, FIG. 1A shows a distribution of the threshold voltages of a large population of cells. Because the cells in a flash device are not exactly identical in their characteristics and behavior (due to, for example, small variations in impurity concentrations or defects in the silicon structure), applying the same programming operation to all of the cells does not cause all of the cells to have exactly the same threshold voltage. Instead, the threshold voltage is distributed as shown in FIG. 1A. Cells storing a value of "1" typically have a negative threshold voltage, such that most of the cells have a threshold voltage close to the central voltage value of the left peak (labeled 1) of FIG. 1A, with fewer cells having threshold voltages lower or higher than the central voltage of the left peak. Similarly, cells storing a value of "0" typically have a positive threshold voltage, such that most of the cells have a threshold voltage close to the central voltage of the right peak (labeled 0) of FIG. 1A, with fewer cells having threshold voltages lower or higher than the central voltage of the right peak.

In recent years, a new kind of flash device has appeared on the market, using "Multi Level Cells" (MLC). The term "Multi-Level Cell" is misleading because flash memory with a single bit per cell uses multiple i.e. two levels, as described above. Therefore, the term "Single Bit Cell" (SBC) is used hereinafter to refer to a memory cell of two levels and the term "Multi-Bit Cell" (MBC) is used hereinafter to refer to a memory cell of more than two levels, i.e. more than one bit per cell. The most common MBC flash memories at present are ones with two bits per cell, and therefore examples are given below using such MBC memories. It should however be understood that the present disclosure is equally applicable to flash memory devices that support more than two bits per cell.

A single MBC cell storing two bits of information is in one of four different states. As the cell's "state" is represented by the cell's threshold voltage, an MBC cell supports four different valid ranges for the cell's threshold voltage. FIG. 1B (prior art) shows the threshold voltage distribution for a typical MDC cell of two bits per cell. As expected, FIG. 1B has four peaks, each peak corresponding to one state. As for the SBC, each state is actually a voltage range and not a single voltage. When reading the cell's contents, the cell's threshold voltage must be correctly identified in a definite voltage range. A cell designed for MBC operation e.g. in four states is typically operable as an SBC cell with two states. For example, it is known that MBC and SBC modes may co-exist within the same device. Thus, one may designate certain parts of the device to operate with highest density in MBC mode, while other parts are used in SBC mode to provide better performance.

MBC devices provide a significant cost advantage. An MBC device with two bits per cell requires about half the area of a silicon wafer than an SBC of similar capacity. However, there are drawbacks to using MBC flash. Average read and write times of MBC memories are longer than of SBC memories, resulting in worse performance. Also, the reliability of MBC is lower than SBC. The differences between the threshold voltage ranges in MBC are much smaller than in SBC. Thus, a disturbance in the threshold voltage (e.g. leakage of stored charge causing a threshold voltage drift or interference from operating neighboring cells) that are insignificant in SBC because of the large gap between the two states, may cause an MBC cell to move from one state to another, resulting in an erroneous bit. The end result is a lower performance specification of MBC cells in terms of data retention time or the endurance of the device to many write/erase cycles.

A First Discussion of Flash Pulse Parameters

The previous section related to MBC devices and "hybrid" devices including both multi-bit and single bit cells. The next three sections relate to both MBC devices, hybrid devices, and SBC-only devices.

FIGS. 1C and 1D illustrate the storage of a bit, either a zero bit or a one bit, in a cell of a flash memory. The examples of FIG. 1C-1D relate to SBC memories For historical reasons, this process of storing data in a flash memory is called "programming" the flash memory. Nominally, a zero bit is represented by a cell threshold voltage $V_0$ and a one bit is represented by a cell threshold voltage $V_1$. Initially, the cell has a nominal threshold voltage $V_1$. For example, after a block of a flash memory has been erased, all the cells have nominal threshold voltages $V_1$. Because of unavoidable inaccuracies in the initializations of the cells, the actual threshold voltages are distributed around the nominal threshold voltage $V_1$ according to a distribution curve 10. Then, to each cell that is to store a zero bit, a train 12 of programming voltage pulses 14 is applied, in order to inject electrons from the cell's silicon substrate through the cell's oxide layer into the cell's floating gate. Because the electrons move through the oxide layer by quantum mechanical tunneling or by hot injection, and because of non-uniformities in the cells' structures, the voltage required to inject enough electrons to increase the threshold voltage from $V_1$ to $V_0$ cannot be predicted accurately in advance. The voltage of the first pulse 14 is a starting voltage $V_S$+ a programming voltage increment $\Delta V$. Every subsequent pulse 14 is higher than its predecessor by $\Delta V$. After each pulse 14 is applied, the cell is tested to see if its threshold voltage is sufficiently close to $V_0$. If the threshold voltage is sufficiently close to $V_0$ then the programming of cell is complete. Otherwise, the next pulse 14 is applied to the cell and the threshold voltage of the cell again is tested. Because the initial threshold voltages are distributed about the nominal voltage $V_1$, and because of inaccuracies in the programming, the threshold voltages of the cells that store zero bits also are distributed about the nominal threshold voltage $V_0$, according to a distribution curve 16.

Data are-read from the flash memory cells by sensing the cells' threshold voltages. A threshold voltage greater than a transition threshold voltage $V_T$ halfway between $V_0$ and $V_1$ is interpreted as a zero bit. A threshold voltage less than $V_T$ is interpreted as a one bit. Over time, primarily because of the tunneling of electrons from the floating gates back to the substrate, the distributions 10 and 16 tend to become broader. The difference between threshold voltages $V_0$ and $V_1$ is selected to be great enough so that, over the lifetime of the flash memory, the likelihoods that the lower end 18 of distribution 16 will descend below $V_T$ and that the upper end 20 of distribution 10 will ascend above $V_T$ are negligible.

A Discussion of Flash Pulse Parameters and "Slow" vs. "Fast" Writing Modes

FIGS. 1E and 1F illustrate the programming of a zero bit in a cell of a flash memory according to a writing mode that is a "fast" writing mode relative to the writing mode illustrated in FIGS. 1C-1D. A train 22 of programming voltage pulses with a programming voltage increment twice as large as the programming voltage increment $\Delta V$ of FIG. 1C is applied to the cell until the threshold voltage of the cell is sufficiently close to $V_0$. The cell of FIGS. 1E and 1F is programmed in less time than the cell of FIGS. 1C and 1D. In some situations, this "speed benefit" may be obtained at the expense of the distribution 24 of the resulting threshold voltages around $V_0$ being wider than distribution 16, which is shown in FIG. 1E in phantom for reference. Thus, the programming technique of FIGS. 1E-1F provides a relatively "fast" writing mode as compared to the relatively "slow" writing mode of FIGS. 1C-1D.

As noted above, average read and write times of MBC memories are longer than of SBC memories, resulting in worse performance. Thus, writing data to an SBC memory may provide a relatively "fast" writing mode compared to writing data to an MBC memory. Furthermore, writing data using the programming technique of FIGS. 1E-1F provides a relatively "fast" writing mode compared to writing data using the programming technique of FIGS. 1C-1D.

The skilled artisan will appreciate that these are just two examples, and that there are other ways in the art to obtain relatively "slow writing modes" and relatively "fast writing modes." Furthermore, although the discussion of FIGS. 1C-1F related to the specific case of SBCS, it is appreciated that the principles described with reference to FIGS. 1C-1F are equally applicable to MBCs.

A Discussion of Flash Devices Coupled to Host Devices

FIG. 2A is a block diagram of an exemplary system including a host device 310 and a flash memory device 260 including a controller 280 and a flash memory 270. Host device 310 and flash memory device 260 are coupled via respective device ports 350, 250 and communicate via communications link 300.

Although host 310 and flash 260 devices are illustrated in FIG. 2A as separate devices, it is understood that in some embodiments, flash device 260 may be deployed within a housing of host device. Alternatively, flash device 260 may be deployed outside of a housing of host device.

In different implementations, host device 310 sends to flash memory storage device 260 requests to read data stored in flash memory 270 and/or to write data to flash memory 270.

It is noted that when the host device 310 sends a write command to the flash device 260, there may be a need for the flash device 260 to write the data to flash memory 270 as soon as possible in. On the other hand, as noted above, sometimes other design considerations (e.g. the need to greater device capacity and/or reliability) may require that a "slower" writing mode that is slower than the fastest possible writing mode be used.

Towards this end, as illustrated in FIG. 2B, it is common in flash devices for flash memory 270 to include both a cache storage area 272 and a main storage area 274. Incoming data may, at least some of the time, be written to the cache storage area 272 and, at a later time, be copied from cache storage area 272 to the main storage area 274.

In different implementations, the cache storage area 272 is written to using a 'faster writing mode' that is faster than a writing mode used for main storage area 274 and/or the main storage area 274 is larger (i.e. has a greater capacity) than the cache storage area 272.

In one particular example, cache storage area 272 includes flash blocks where K bits of data are stored in each flash cell where K is a positive integer, and the main storage area 274 includes flash blocks where L bits of data are stored in each flash cell where L is a positive integer that exceeds K.

There is an ongoing need for improved techniques and apparatus for storing data in flash memories that include cache storage area(s) and main storage area(s).

SUMMARY OF EMBODIMENTS OF THE INVENTION

Some embodiments relate to a method and apparatus for enforcing a first flash caching policy which permits intra-die cache-data-transfer operations while forbidding inter-die cache-data-transfer operations. Some embodiments relate to a method and apparatus for enforcing a second flash caching policy which permits intra-plane cache-data-transfer operations while forbidding inter-plane cache-data-transfer operations.

It is now disclosed for the first time a flash memory device comprising: a) a flash memory including a plurality of flash memory dies, each flash memory die including a respective cache storage area and a respective main storage area; and b) control circuitry operative to: i) receive data from an external host device; ii) determine to which main storage area the received data is addressed, thereby specifying one of the plurality of flash memory dies as a target die for the received data; and iii) whenever the received data is written into a cache storage area before being written into a main storage area, write the received data into the cache storage area of the specified target die.

According to some embodiments, the control circuitry is operative such that all data received from the external host device is written into a cache storage area before being written into a main storage area.

According to some embodiments, the control circuitry is operative such that some data received from the external host device is written into a cache storage area before being written into a main storage area, while other data received from the external host device is written into a main storage area without first being written into a cache storage area.

According to some embodiments, the control circuitry is operative, whenever the received data is written into a cache storage area before being written into a main storage area, to write the received data into only one cache storage area.

According to some embodiments, the control circuitry is operative to determine to which main storage area the received data is addressed in accordance with address information for the received data that is received from the external host device.

According to some embodiments, for each die of the plurality of flash memory dies, the respective main storage area is configured to store more bits per flash cell than the respective cache storage area.

According to some embodiments, the control circuitry is further operative to locally copy the received data from the cache storage area of the specified target die to the main storage area of the specified target die such that the data does not leave the target storage die during the local copying.

According to some embodiments, i) for each die of the plurality of dies, the control circuitry is operative to carry out a respective local copying; and ii) the control circuitry is operative to simultaneously carry out the local copyings for the different dies of the plurality of dies.

According to some embodiments, the control circuitry includes at least one of software and firmware.

According to some embodiments, A) each die of the plurality of dies includes a respective plurality of planes, each plane including a respective plane cache storage area and a respective plane main storage area; and B) the control circuitry is further operative to: iv) determine to which plane main storage area on the target die the received data is addressed, thereby specifying one of the planes of the target die as a target plane for the received data; and v) whenever the received data is written into a plane cache storage area before being written into a plane main storage area, write the received data into the plane cache storage area of the specified target plane on the specified target die.

It is now disclosed for the first time a method of data caching in a system including a flash memory device coupled to an external host device, the flash memory device including a plurality of flash memory dies, each flash memory die including a respective cache storage area and a respective main storage area, the method comprising: a) receiving data by the flash memory device from an external host device; b) determining to which main storage area the received data is addressed, thereby specifying one of the plurality of flash memory dies as a target die for the received data; and c) whenever the received data is written into a cache storage area before being written into a main storage area, writing the received data into the cache storage area of the specified target die.

According to some embodiments, d) whenever the received data is written into a main storage area, writing the received data into the corresponding cache storage area before the data is written into the main storage area.

According to some embodiments, the method further comprises: d) writing a first portion of the received data into the cache storage area of the specified target die; and e) writing a second portion of the received data into the main storage area of the specified target die without first writing the second portion into any cache storage area.

According to some embodiments, the method further comprises: d) whenever the received data is written into a cache storage area before being written into a main storage area, writing the received data into only one cache storage area According to some embodiments, the determining of step (b) is carried out in accordance with address information for the received data that is received from the external host device.

According to some embodiments, the method further comprises: d) whenever the received data is written into a cache storage area before being written into a main storage area: i) writing the received data into the cache storage area of the specified target die using a first writing mode that provides a first number of bits per flash cell; and ii) subsequently writing the received data into the main storage area of the specified target die using a second writing mode that provides a second number of bits per flash cell that exceeds the first number.

According to some embodiments, the method further comprises: d) whenever the received data is written into a cache storage area-before being written into a main storage area, locally copying the data from the cache storage area of the specified target die to the main storage area of the specified target die such that the data does not leave the target storage die during the local copying.

According to some embodiments, i) a respective local copying is carried out for each die of the plurality of dies; and ii) the local copyings are simultaneously carried out for the different dies of the plurality of dies.

According to some embodiments, i) the method is performed in a system where each die of the plurality of dies includes a respective plurality of planes, each plane including a respective plane cache storage area and a respective plane main storage area; and ii) the method further comprises: d) determining to which plane main storage area on the target die the received data is addressed, thereby specifying one of the planes of the target die as a target plane for the received data; and e) whenever the received data is written into a plane cache storage area before being written into a plane main storage area, writing the received data into the plane cache storage area of the specified target plane on the specified target die.

It is now disclosed for the first time flash memory device comprising: a) a flash memory including at least one flash memory die, the flash memory die including a plurality of planes, each plane including a respective cache storage area and a respective main storage area; and b) control circuitry operative to: i) receive data from an external host device; ii) determine to which main storage area the received data is addressed, thereby specifying one of the plurality of flash memory planes as a target plane for the received data; and iii) whenever the received data is written into a cache storage area before being written into a main storage area, write the received data into the cache storage area of the specified target plane.

According to some embodiments, the control circuitry is operative such that all data received from the external host device is written into a cache storage area before being written into a main storage area.

According to some embodiments, the control circuitry is operative such that some data received from the external host device is written into a cache storage area before being written into a main storage area, while other data received from the external host device is written into a main storage area without first being written into a cache storage area.

According to some embodiments, the control circuitry is operative, whenever the received data is written into a cache storage area before being written into a main storage area, to write the received data into only one cache storage area.

According to some embodiments, the control circuitry is operative to determine to which main storage area the received data is addressed in accordance with address information for the received data that is received from the external host device.

According to some embodiments, for each plane of the plurality of flash memory planes, the respective main storage area is configured to store more bits per flash cell than the respective cache storage area.

According to some embodiments, the control circuitry is further operative to locally copy the received data from the cache storage area of the specified target plane to the main storage area of the specified target plane such that the data does not leave the target storage plane during the local copying.

According to some embodiments, i) for each plane of the plurality of planes, the control circuitry is operative to carry out a respective local copying; and ii) the control circuitry is operative to simultaneously carry out the local copying for the different planes of the plurality of planes.

According to some embodiments, the control circuitry includes at least one of software and firmware.

It is now disclosed for the first time a method of data caching in a system including a flash memory device coupled to an external host device, the flash memory device including at least one flash memory die, the flash memory die including a plurality of planes, each plane including a respective cache storage area and a respective main storage area. The method comprises: a) receiving data by the flash memory device from an external host device; b) determining to which main storage area the received data is addressed, thereby specifying one of the plurality of flash memory planes as a target plane for the received data; and c) whenever the received data is written into a cache storage area before being written into a main storage area, writing the received data into the cache storage area of the specified target plane.

According to some embodiments, the method further comprises: d) whenever the receives data is written into a main storage area, writing the received data into the corresponding cache storage area before the data is written into the main storage area.

According to some embodiments, the method further comprises: d) writing a first portion of the received data into the cache storage area of the specified target plane; and e) writing a second portion of the received data into the main storage area of the specified target plane without first writing the second portion into any cache storage area.

According to some embodiments, the method further comprises: d) whenever the received data is written into a cache storage area before being written into a main storage area, writing the received data into only one cache storage area.

According to some embodiments, the determining of step (b) is carried out in accordance with address information for the received data that is received from the external host device.

According to some embodiments, the method further comprises: d) whenever the received data is written into a cache storage area before being written into a main storage area: i) writing the received data into the cache storage area of the specified target plane using a first writing mode that provides a first number of bits per flash cell; and ii) subsequently writing the received data into the main storage area of the specified target plane using a second writing mode that provides a second number of bits per flash cell that exceeds the first number.

According to some embodiments, the method further comprises: d) whenever the received data is written into a cache storage area before being written into a main storage area, locally copying the data from the cache storage area of the specified target plane to the main storage area of the specified target plane such that the data does not leave the target storage plane during the local copying.

According to some embodiments, i) a respective local copying is carried out for each plane of the plurality of planes; and ii) the local copyings are simultaneously carried out for the different planes of the plurality of planes.

It is now disclosed for the first time a computer readable medium having stored therein computer readable program code for data caching in a system including a flash memory device coupled to an external host device, the flash memory device including a plurality of flash memory dies, each flash memory die including a respective cache storage area and a respective main storage area, the program code being operable to: a) receive data by the flash memory device from an external host device; b) determine to which main storage area the received data is addressed, thereby specifying one of the plurality of flash memory dies as a target die for the received data; and c) whenever the received data is written into a cache storage area before being written into a main storage area, write the received data into the cache storage area of the specified target die.

It is now disclosed for the first time a computer readable medium having stored therein computer readable program code for data caching in a system including a flash memory device coupled to an external host device, the flash memory device including at least one flash memory die, the flash memory die including a plurality of planes, each plane including a respective cache storage area and a respective main storage area, the program code being operable to: a) receive data by the flash memory device from an external host device; b) determine to which main storage area the received data is addressed, thereby specifying one of the plurality of flash memory planes as a target plane for the received data; and c) whenever the received data is written into a cache storage area before being written into a main storage area, write the received data into the cache storage area of the specified target plane.

It is noted that features described above as pertaining to certain embodiments may also be included in other embodiments, unless indicated to the contrary herein below.

BRIEF DESCRIPTION OF THE DRAWINGS

FIG. 1C shows the distribution of threshold voltages of a two-level EPROM cell according to the prior art.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods and apparatuses for flash cache management is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Figure 4:
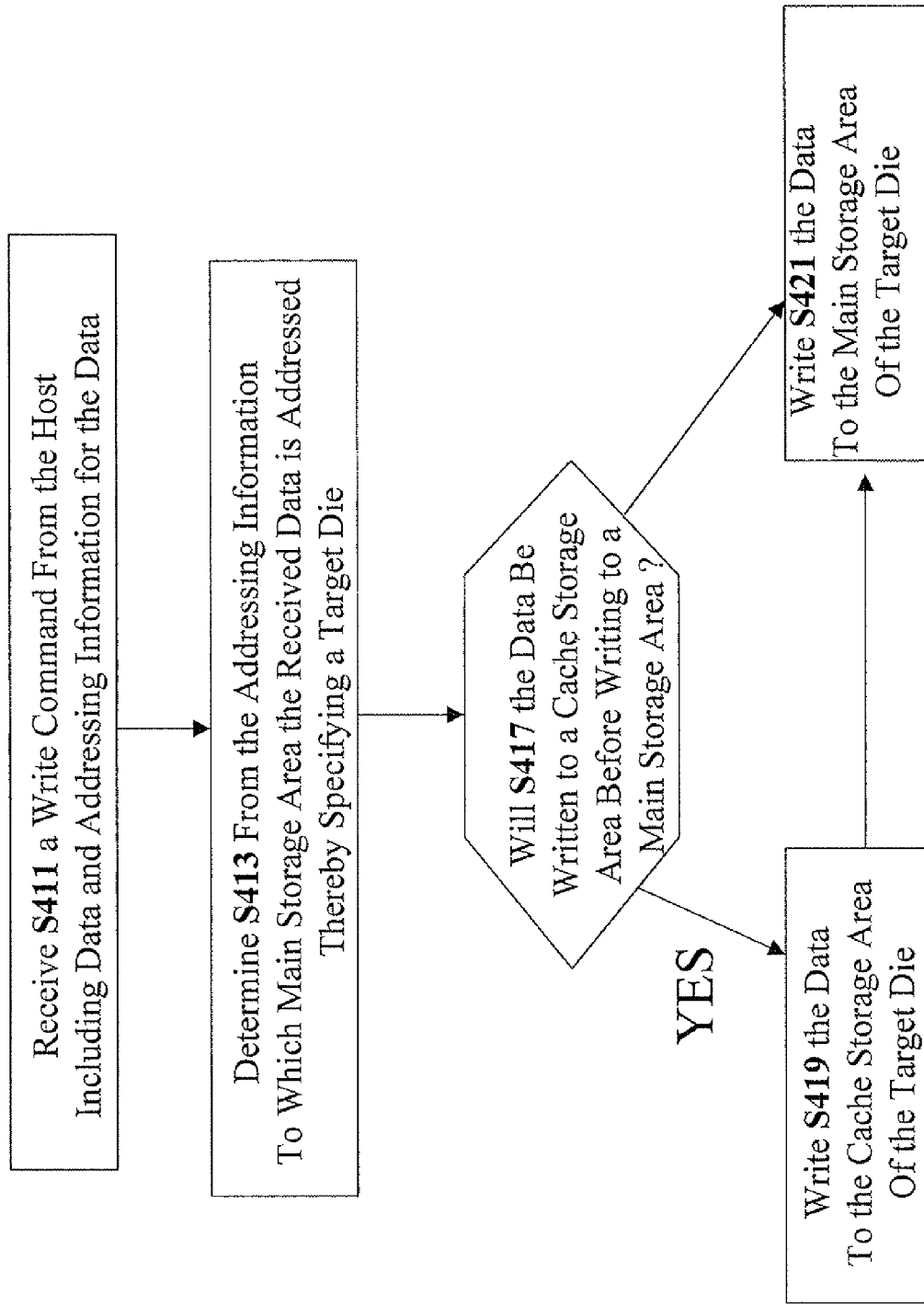
FIG. 4 is a flow chart of an exemplary routine for enforcing a flash memory caching policy for a multi-die flash memory in accordance with some embodiments.

Some embodiments relate to a method and apparatus for enforcing a first flash caching policy which permits intra-die cache-data-transfer operations while forbidding inter-die cache-data-transfer operations. This device caching policy may be enforced for a flash memory that includes plurality of flash memory dies, for example, as illustrated in FIG. 4.

Figure 8:
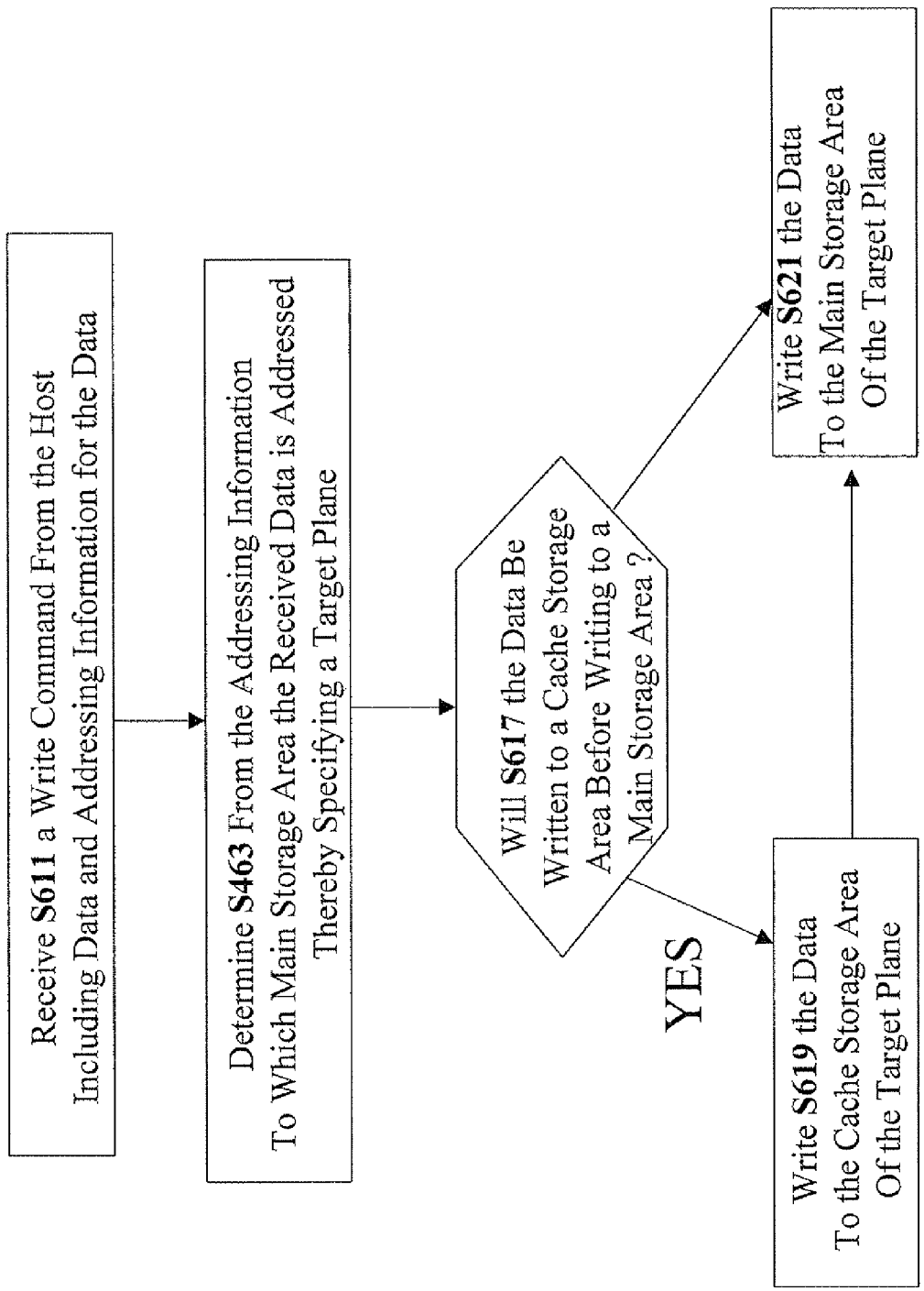
FIG. 8 is a flow chart of an exemplary routine for enforcing a flash memory caching policy for a multi-plane flash memory die in accordance with some embodiments.

Some embodiments relate to a method and apparatus for enforcing a second flash caching policy which permits intra-plane cache-data-transfer operations while forbidding inter-plane cache-data-transfer operations. This device caching policy may be enforced for a flash memory die that includes plurality of memory planes, for example, as illustrated in FIG. 8.

Figure 1A:
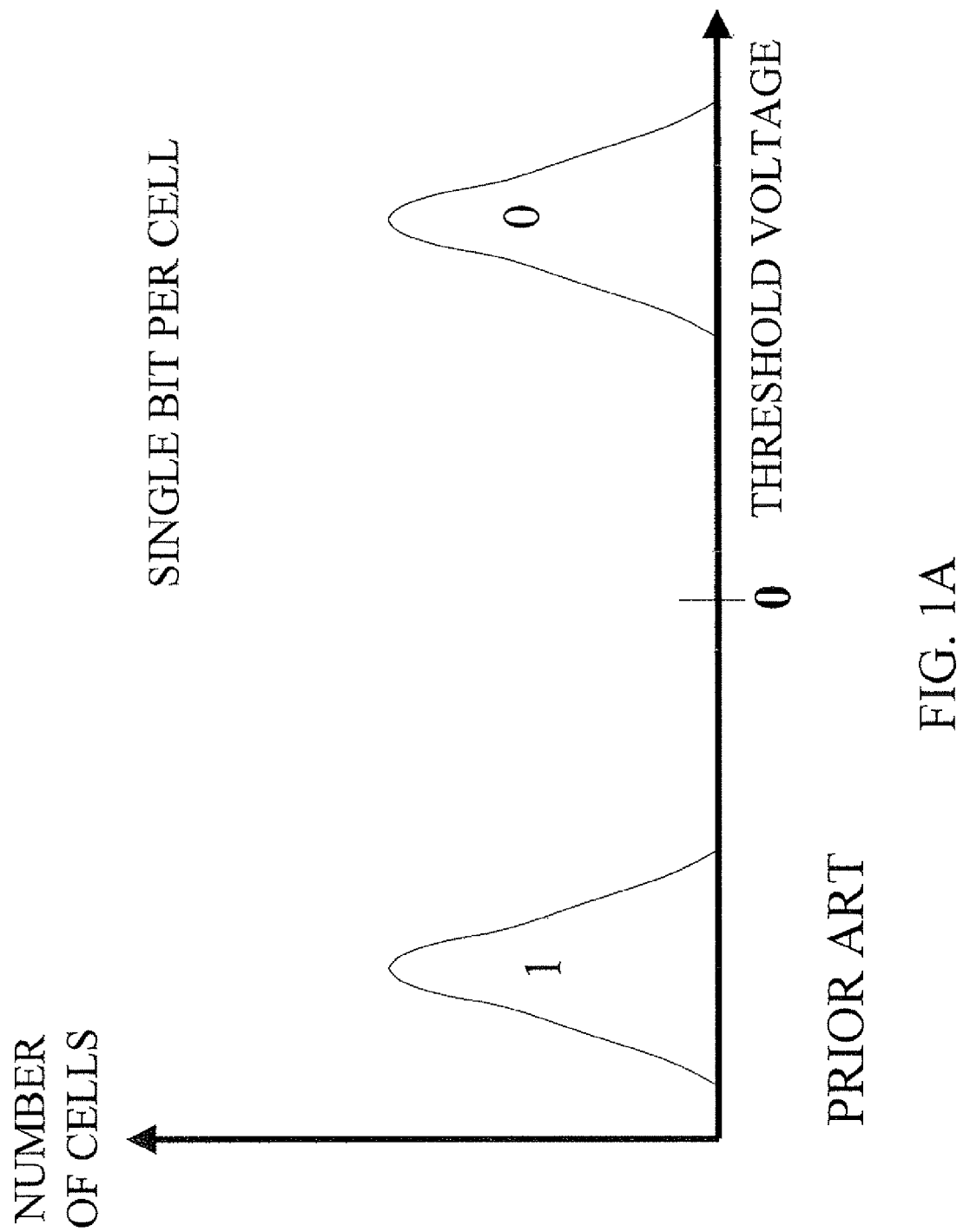
FIGS. 1A-1B are a graphical illustration of distributions of thresholds voltages of a large population of memory cells (prior art).
Figure 1B:
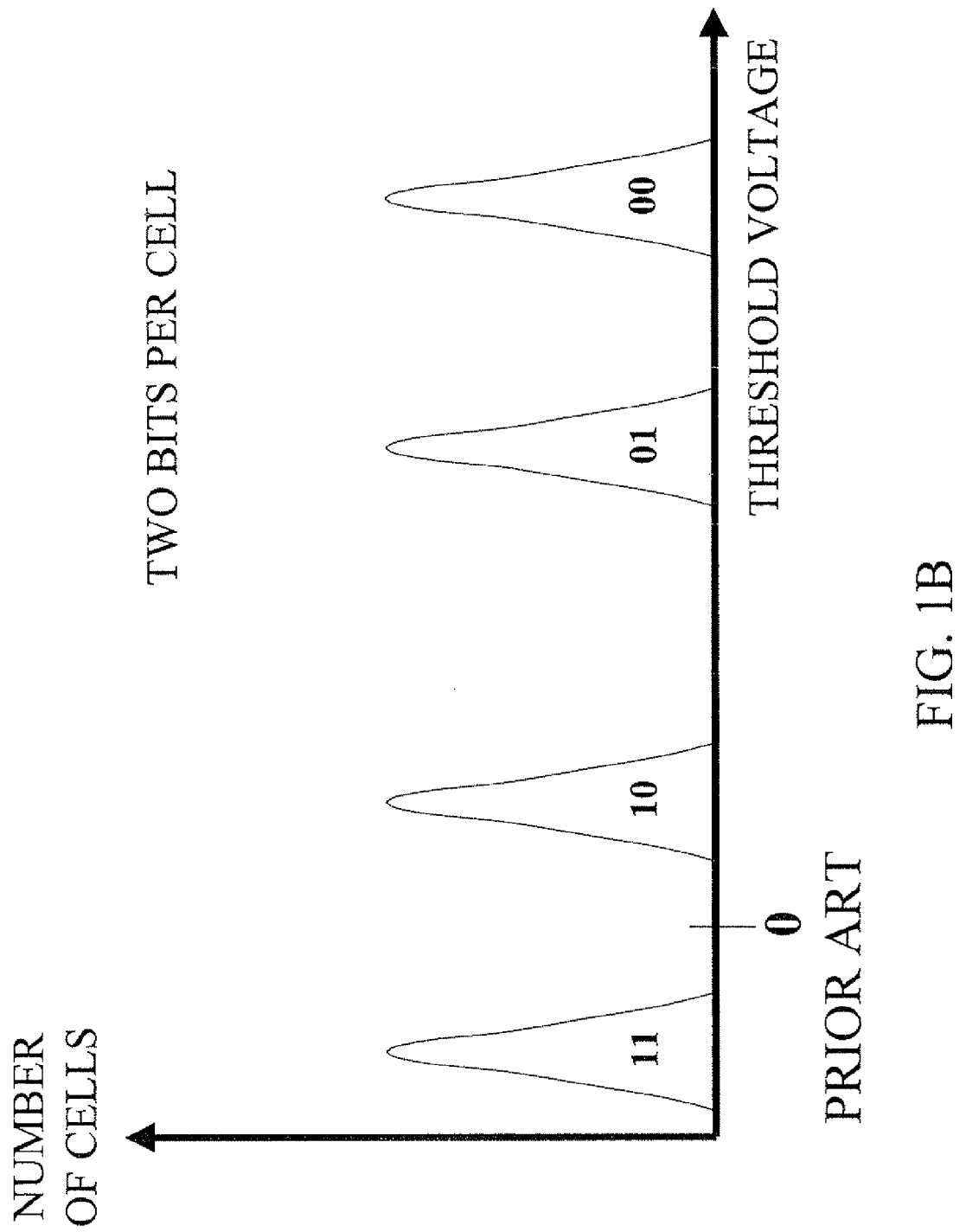
Figure 1D:
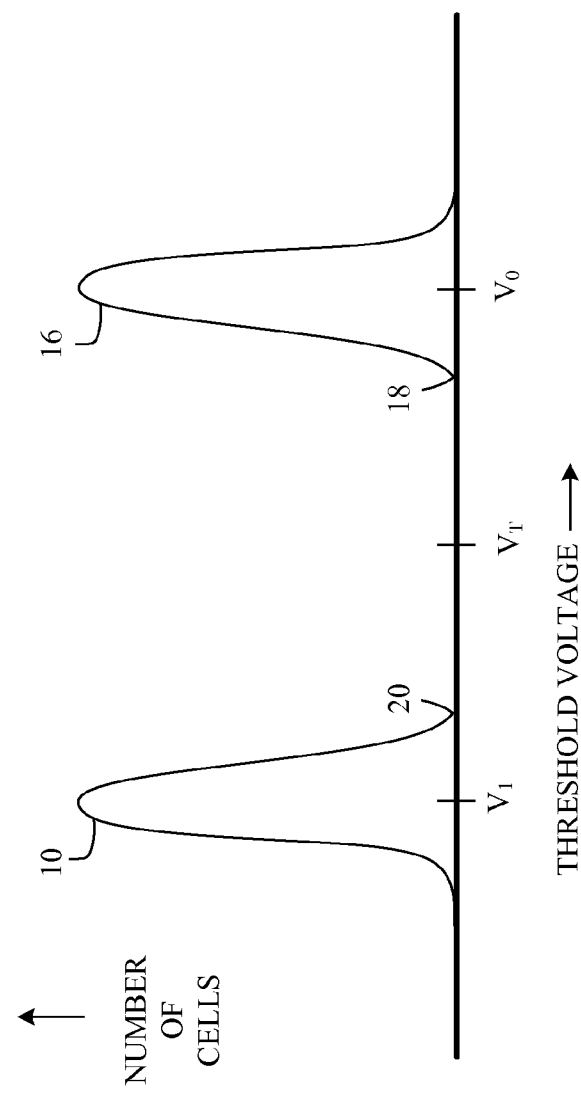
FIG. 1D shows the programming pulse train of an EPROM cell according to the prior art.
Figure 1E:
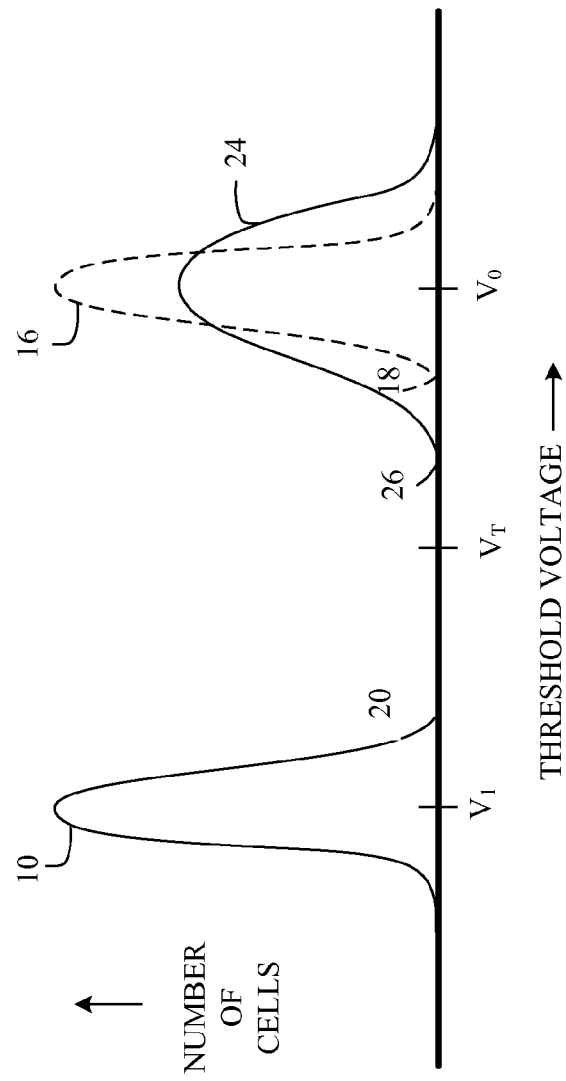
FIG. 1E shows the distribution of threshold voltages of a two-level EPROM cell programmed using a larger programming voltage increment and/or wider programming pulses than in the prior art than in FIG. 1D (prior art).
Figure 1F:
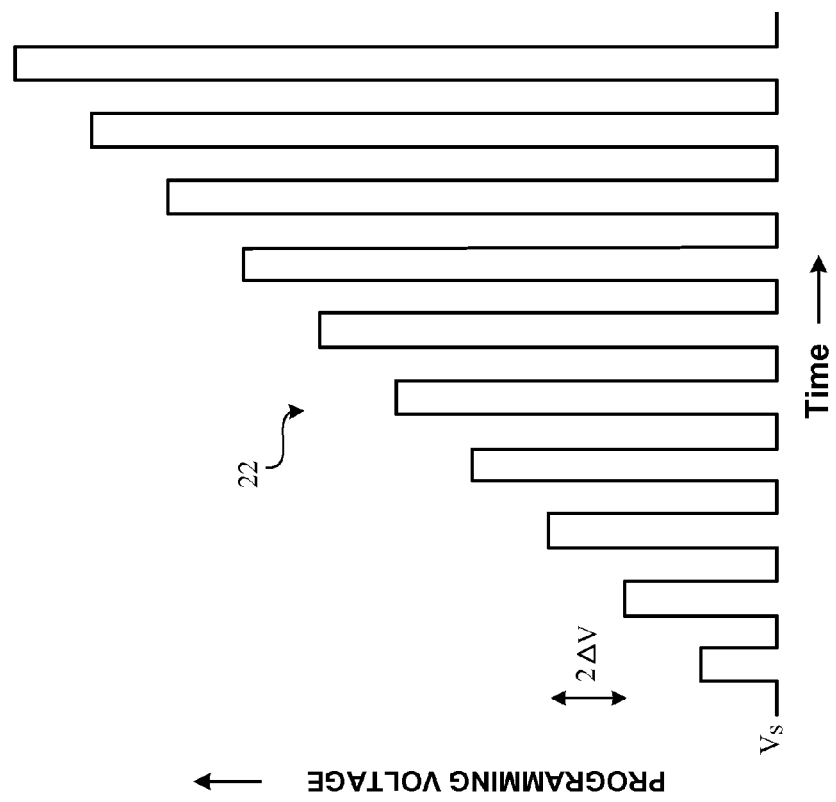
FIG. 1F shows programming pulse trains used to program the upper threshold voltage of FIG. 1E (prior art).
Figure 2A:
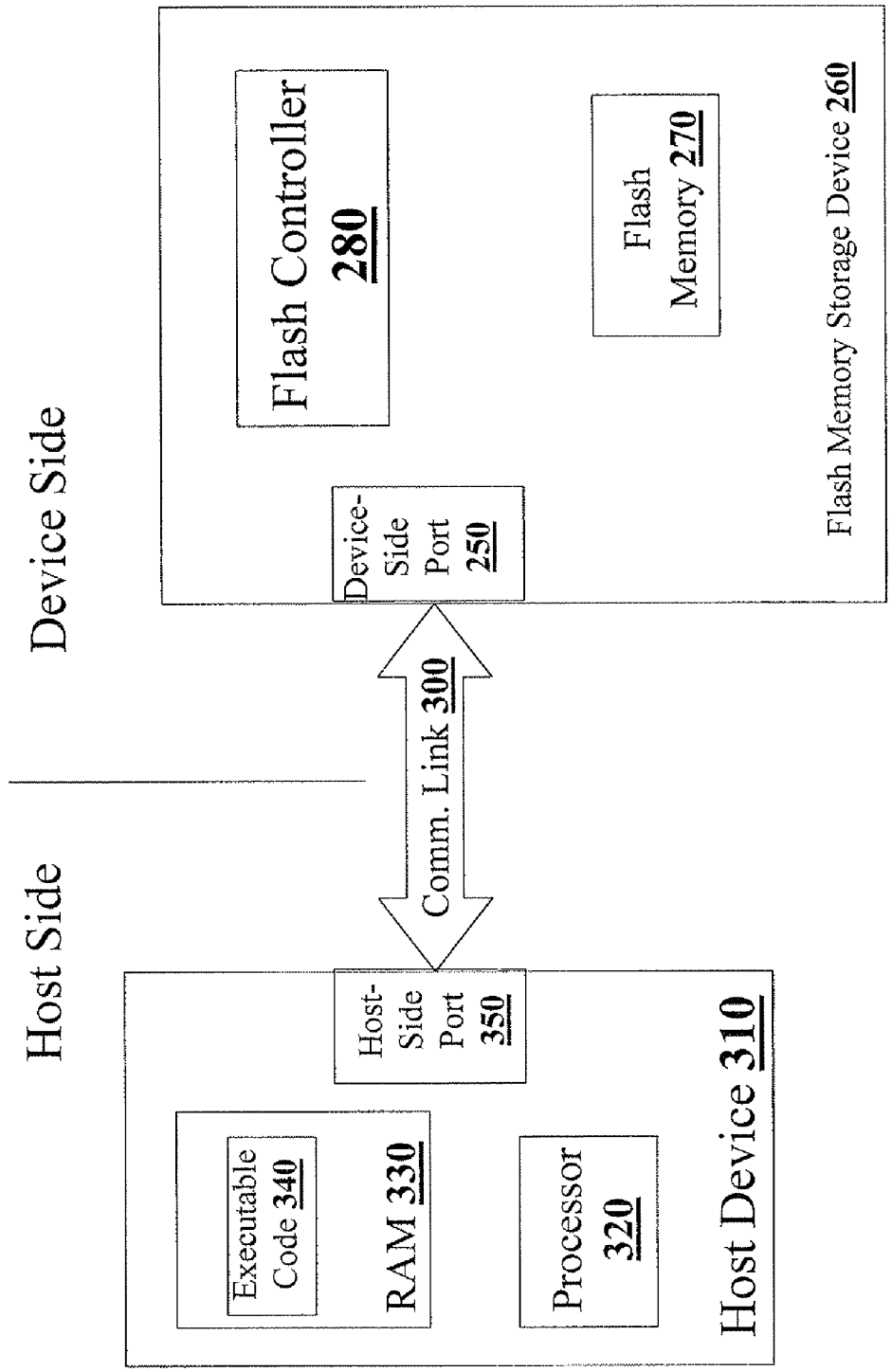
FIG. 2A is a block diagram of an exemplary system including a host device and a flash memory device (prior art).
Figure 2B:
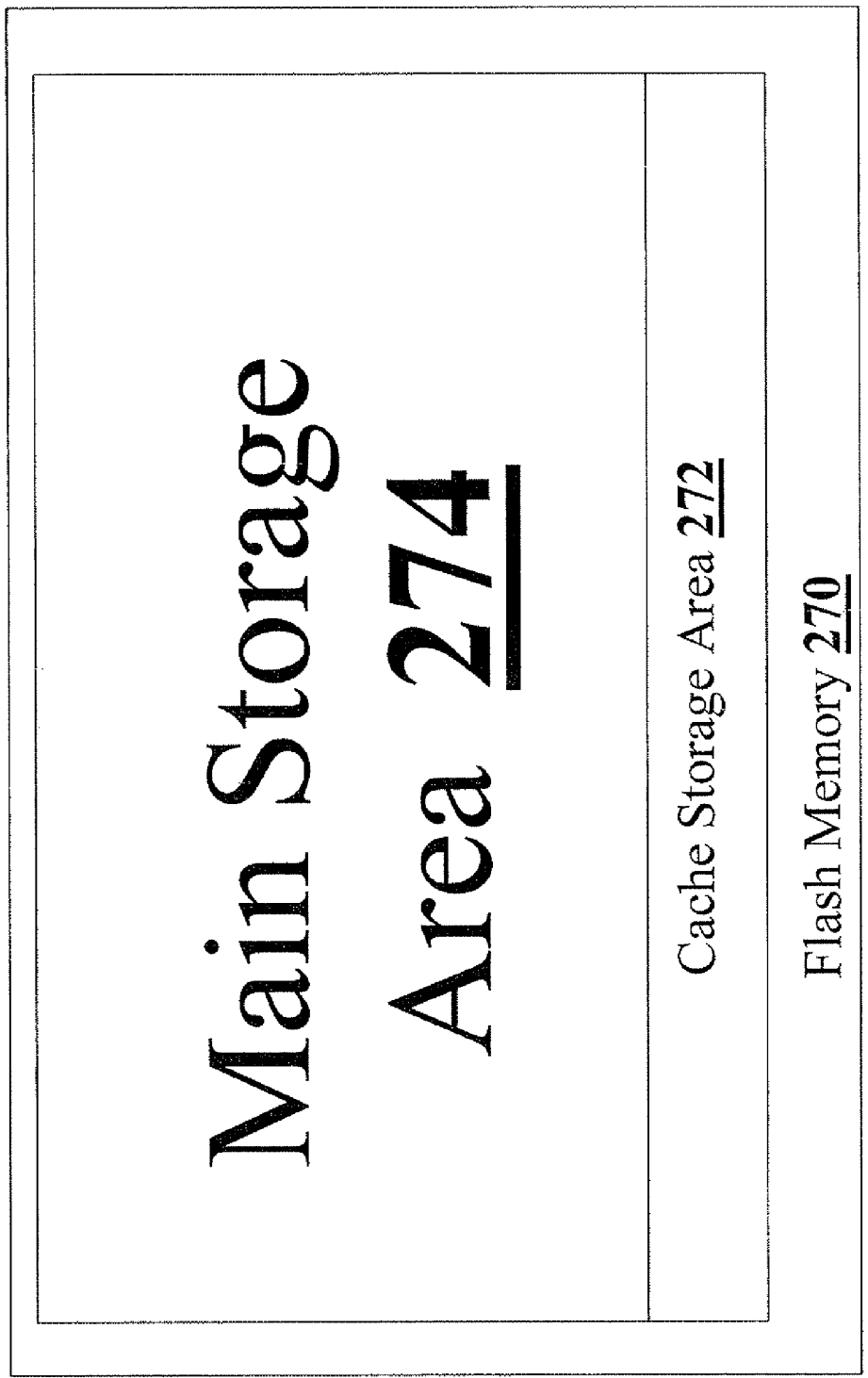
FIG. 2B (prior art) is a block diagram of a flash memory that includes a cache storage area and a main storage area.
Figure 3:
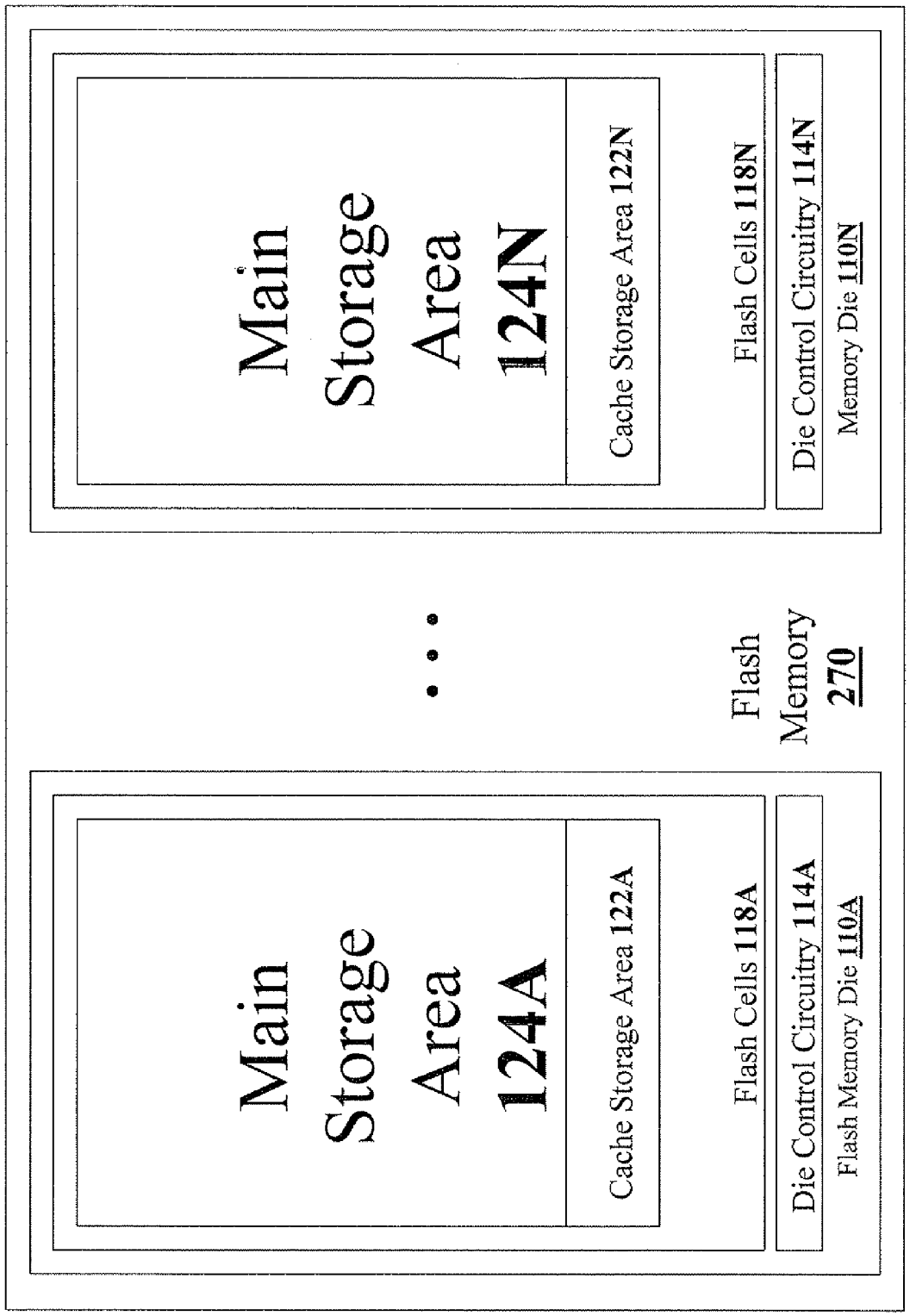
FIG. 3 is a block diagram of an exemplary flash memory that includes a plurality of flash memory dies in accordance with some embodiments.

A Brief Discussion of FIG. 3

FIG. 3 is a block diagram of an exemplary flash memory 270 including a plurality of flash memory dies 110 (i.e. N flash memory dies where N is an integer greater than or equal to two). In the non-limiting example of FIG. 3, each flash memory die 110 includes respective flash cells 118 in which data may be stored and respective die control circuitry 114. Die control circuitry 114 may include any combination of hardware, firmware and/or software. In one particular example, each die control circuitry 114 may include respective dedicated read/write circuits (including, for example, a respective dedicated die-local data bus) for programming data. Furthermore, it is appreciated that in some embodiments, flash memory 270 may include additional dies other than those illustrated in FIG. 3.

As illustrated in FIG. 3, each flash memory die 110 includes a respective main storage area 124 and a respective cache storage area 122. The flash memory dies are configured within flash memory storage device 260 such that at least some 'incoming' data received from host device 310 via device-side port 250 is either (i) written first to one of the cache storage areas 122 (for example, in response to receiving the 'incoming' data from the host device 160) and then copied from the cache storage area 122 to one of the main storage areas 124; or (ii) written 'directly' to one of the main storage areas 124 without first being written to one of the cache storage areas.

Cache storage areas 122 and main storage areas 124 preferably provide the following features:

Feature A) each cache storage area 122k (i.e. k is a positive integer) is smaller (i.e. has less storage capacity) than a respective main storage area 124k co-residing on the same flash; and Feature B) each cache storage area 122k is configured to store data using a respective 'first writing speed mode' and each main storage area 124k is configured to store data using a respective 'second writing speed mode'—the respective 'first writing speed mode' of the respective cache storage area provides faster flash programming than the respective 'second writing speed mode.'

It is appreciated that "Feature A" and "Feature B" are per die features, and do not require any relationship between, for example, a size and/or writing speed of a first die and a size and/or writing speed of a second die different from the first die.

It is understood that when a "cache storage area" or a "main storage area" of a flash die is "configured" to provide a specific feature (for example, configured to provide a given writing speed mode and/or configured to store a given number of bits per flash cell), that this feature may be provided by any element within flash memory device 260—for example, by flash controller 280 and/or flash memory 270 or any portion thereof). There is no requirement that the feature be provided exclusively by element(s) on the flash die.

Thus, in one non-limiting example, the flash cells of the cache storage area 122 and the main storage 124 have a similar physical structure, but the flash controller 280 and/or the die control circuitry 114 is configured: (i) to write data to the flash cells of the cache storage area 122 using a first writing mode associated with a first writing speed (for example, K bits per cell where K is a positive integer), and (ii) to write data to the flash cells of the cache storage area 124 using a second writing mode associated with a second writing speed that is slower than the first writing speed (for example, L bits per cell where L is a positive integer that is greater than K). It is appreciated that other techniques for providing a "slower writing mode" and a "faster writing mode" may be used.

Thus, in some embodiments, each die of the plurality of flash memory dies is configured such that the respective main storage area stores more bits per flash cell than the respective cache storage area.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

"Incoming data" refers to data received by a flash memory device 260 from host device 310 that has not yet been stored in flash memory 270 of the flash memory device 260. "Incoming data" may be temporarily stored (for example, by flash controller 280*) in volatile memory (not shown) within the flash memory device 260.

Incoming data that is received by flash device 260 from host device 310 may be associated with "addressing information" that is also received from the host device 310. The addressing information describes a location in one of the main storage areas 124 (and/or in a location in one of the main storage areas 524 of FIG. 7) to which the flash device 260 is to store the incoming data. Examples of "addressing information" include but are not limited to an absolute physical address, an absolute logical address, a sector or block identifier, and a name of a data object (for example, a filename). It is appreciated that, in some embodiments, the addressing information only indirectly describes the physical target location in one of the main storage areas 124 (and/or one of the main storage areas 524 of FIG. 7). In these embodiments, the flash device 260 may maintain and use one or more 'mapping data structures' (for example, logical-to-physical address mapping tables or any other data structure) which describe a relation between the addressing information received from the host and a target die.

A "target die" is a die on which a main storage area (i.e. any of 124A . . . 124N) specified (i.e. either directly or indirectly) in the addressing information (i.e. therefore 'targeted' by the addressing information received from host 310) resides.

When data is copied from a cache storage area 122i of a first memory die to a main storage area 122j of a second memory die where i and j are positive integers that are not equal to each other this is referred to as a "inter-die cache-data-transfer operation." One example of an 'inter-die cache-data-transfer operation' is when (i) "incoming data" is initially written (e.g. written by flash controller 280 in response to the receiving of the 'incoming data' from host device 310) to cache storage area 122i of the first memory die and (ii) subsequently, in the subsequent inter-die cache-data-transfer operation, copied from cache storage area 122i of the first memory die to main storage area 124j of the second memory die.

When data is copied from a cache storage area 122i of a given memory die to a main storage area 122i of the same memory die where i is a positive integer, this is referred to as an "intra-die cache-data-transfer operation." One example of an 'intra-die cache-data transfer operation' is when (i) "incoming data" is initially written (e.g. written by flash controller 280 in response to the receiving of the 'incoming data' from host device 310) to cache storage area 122i of the memory die and (ii) subsequently, in the subsequent intra-die cache-data-transfer operation, copied from cache storage area 122i of the memory die to main storage area 124i of the same memory die.

There is no requirement that the data be "locally" copied—i.e. copied in a manner such that the data remains on the particular die of the 'intra-die cache-data-transfer operation' en transit from the cache storage area 122i of the die to the main storage area 124i . Thus, in one non-limiting example, flash controller 280 is on a "controller die" that is different from the flash memory dies, and the data is copied from the cache storage area 122i of the die to the main storage area 124i of the same die by the flash controller 280. In this non-limiting example, the data may reside, for example, in volatile memory (e.g. RAM or one or more register(s)) for some period of time en transit from the cache storage area 122i of the die to the main storage area 124i.

In a much preferable alternate example, the data is "locally copied" and does, in fact, remain, on the particular die of the 'intra-die cache-data-transfer operation' en transit from the cache storage area 122i of the die to the main storage area 124i . For example, the data may be "locally" copied by die control circuitry 114i which co-resides on the same die as the cache storage area 122i and the main storage area 124i . In some embodiments, this alternate example may be much preferable because it may save controller resources or controller-flash bus bandwidth while copying data from cache area to main area. This allows concurrent cache copying operations to run in parallel in different dies (as further explained below), thus improving the storage system performance.

A Discussion of FIG. 4

FIG. 4 is a flow chart of an exemplary technique for enforcing a flash caching policy which permits intra-die cache-data-transfer operations while forbidding inter-die cache-data-transfer operations.

In step S411, incoming data that is associated with addressing information for the data is received into flash device 260 from host device 310—for example, as part of a write command.

In step S413, it is determined (for example, by the device controller 280) from the addressing information to which main storage area (i.e. one of 110A . . . 110N) the received data is addressed. By determining to which main storage area the storage area the received data is addressed, a flash die of the N flash dies is specified.

As noted earlier, not all data is required to be cached to a cache storage area 122i before being stored in a main storage area 124i —only in some embodiments is this is the case. Thus, in the example of FIG. 4, it is determined whether or not data will be written to a cache storage area (i.e. one of 122A . . . 122N before being written to a main storage area (i.e. one of 124A . . . 124N). In one non-limiting example, the decision of step S417 of whether or not to cache data may be carried out in accordance with a number of factors, for example, according to a rate in which data is received into the flash device 260 and/or in accordance with how full the cache is and/or in accordance with an 'operating mode' of flash device 260 and/or in accordance with any other factor.

In the event that data is not going to be cached, the data is written in step S421 (for example, written from volatile storage within flash device 260) to the main storage area of the target die specified directly or indirectly by the addressing information.

Otherwise, in the event that data is to be written into a cache storage area (i.e. one of 122A . . . 122N) before being written into a main storage area (i.e. one of 124A . . . 124N), then the data is written in step S419 to the cache storage area 122i (where i is a positive integer) which co-resides on the same "target die" 110i as the main storage area 124i specified directly or indirectly in the addressing information for the data.

In some embodiments, the data is written to only one cache storage area 122i —the device is operative such that whenever the received data is written into a cache storage area 122 before being written into a main storage area 124, the received data is written to only one cache storage area 122i —i.e. only to the main storage area residing on the "target die" 110i . Thus, in these embodiments, the received data is not written to any other cache storage area 122j (where j is a positive integer that is not equal to i).

In step S421 (i.e. when step S421 is carried out after step S419), the data is copied in an 'intra-die cache-data-transfer operation' from cache storage area 122i to main storage area

124i. By writing data, in step S419, into a cache storage area which co-resides on the same die as the main storage area specified (i.e. directly or indirectly) by the addressing information, it is possible to enforce a caching policy which allows intra-die cache-data-transfer operations (i.e. in step S421 when this is executed after step S419 and when data is copied from cache storage area 122i to main storage area 124i), and forbids inter-die cache-data-transfer operations. As explained above, limiting cache copying operations to intra-die cache-data-transfer operations and avoiding inter-die cache-data-transfer operations may provide performance improvement and may be highly desirable.

Figure 5A:
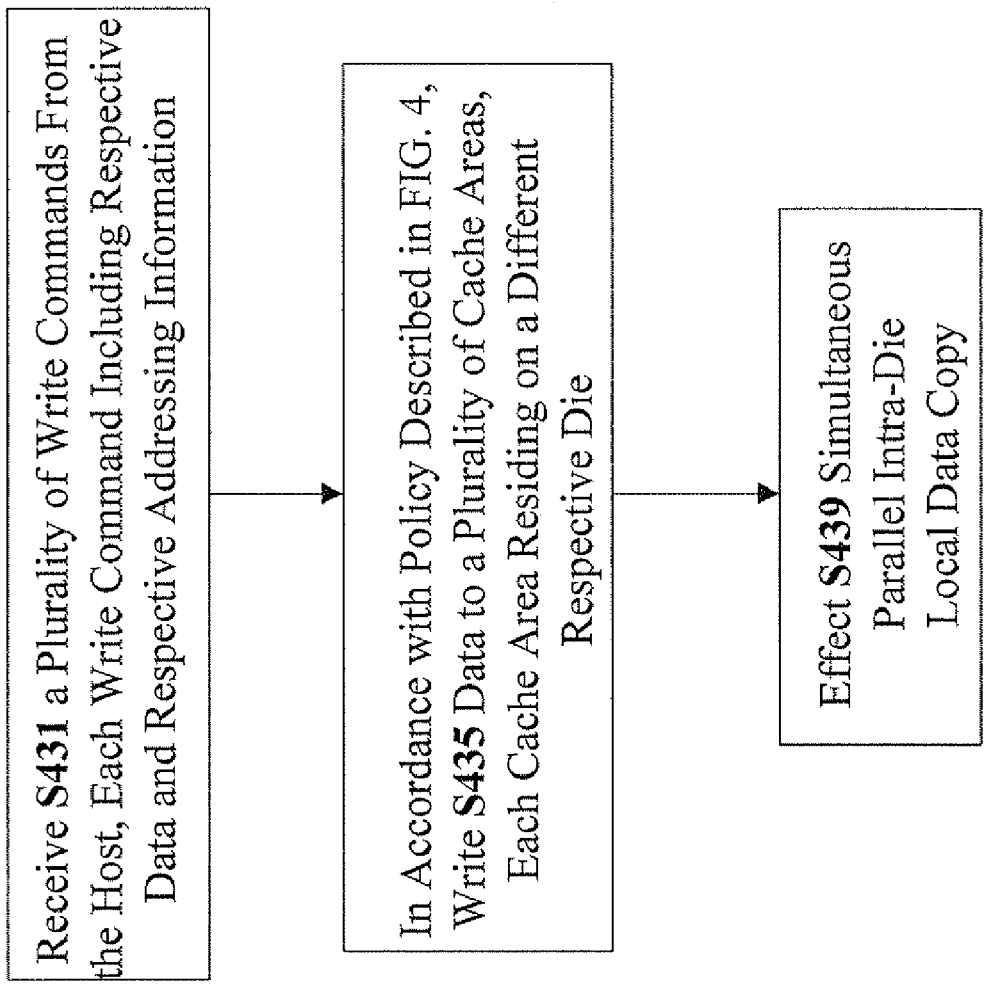
FIG. 5A is a flow chart of an exemplary routine for receiving data and effecting a simultaneous parallel intra-die cache flushing operation.
Figure 5B:
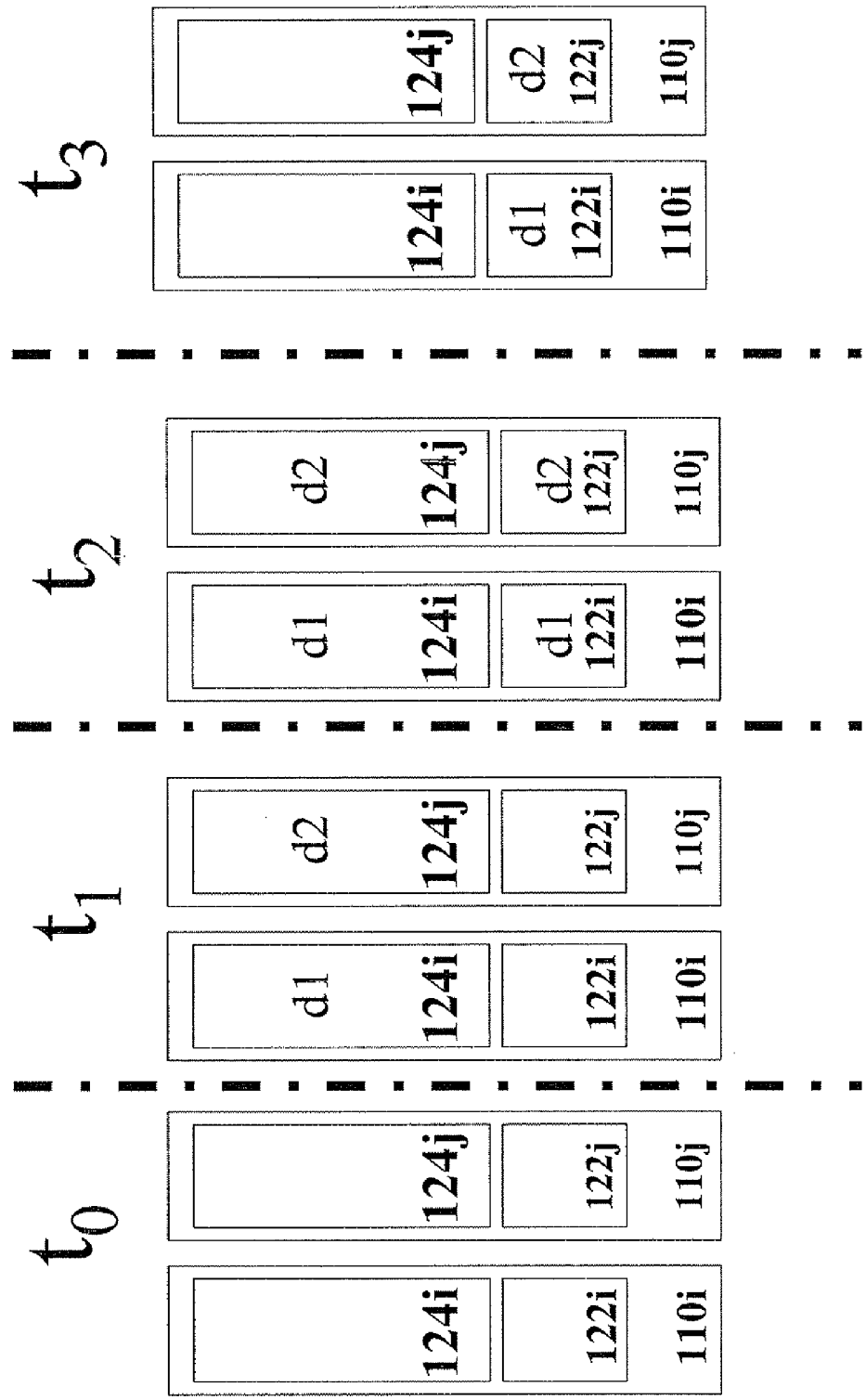
FIG. 5B illustrates a use case for the routine of FIG. 5A.

A Discussion of FIGS. 5A-5B

FIG. 5A is a flow chart of a routine where, over a period of time, different "chunks" of data are received, where each chunk is addressed to a particular main storage area residing on a particular target die. One non-limiting example of how implementing the routine of FIG. 5A affects the contents of the flash memory dies is shown in FIG. 5B.

In FIG. 5B, t0 is a first point in time, t1 is a later point in time after t0, and t2 is a later point in time after t1, and t3 is a later point in time after t1. In the example of FIG. 5B, data d1 is addressed (i.e. according to addressing information received from host 310) to main storage area 124i on die 110i, while data d2 is addressed to main storage area 124j on die 110j, where i and j are positive integers that not equal to each other.

In the example of FIG. 5B, at a time after t0 and before t1, data d1 and d2 as well as the addressing information for data d1 and d2 are received into flash device 260 from host device 310. This may occur when flash device 260 receives a plurality of write commands from the host where each command includes respective data and respective addressing information as indicated in step S431 of FIG. 5A.

In step S435 shown in FIG. 5A, data received from host device 310 is written to a plurality of cache storage areas in accordance with the policy described in FIG. 4. Thus, whenever data is addressed to a given main storage area of the plurality of main storage areas 124A ... 124N (i.e. residing on a 'target' die), and whenever this data is cached to one of the cache storage areas 122A ... 122N before being written to the main storage areas, the data is written (see step S419) to the cache storage area that co-resides on the same die (i.e. the target die) as the given main storage area to which the data is addressed.

This may be seen in the example of FIG. 5B—because data d1 is addressed to main storage area 124i, data d1 is written at a time after t0 and before t1 to cache storage area 122i. Similarly, because data d2 is addressed to main storage area 124j, data d2 is written at a time after t0 and before t1 to cache storage area 122j.

In step S439, a simultaneous parallel intra-die cache local copying operation is carried out—i.e. a respective "locally copying" is carried out on each die, where the local copyings for the different dies are carried out simultaneously.

Figure 6A:
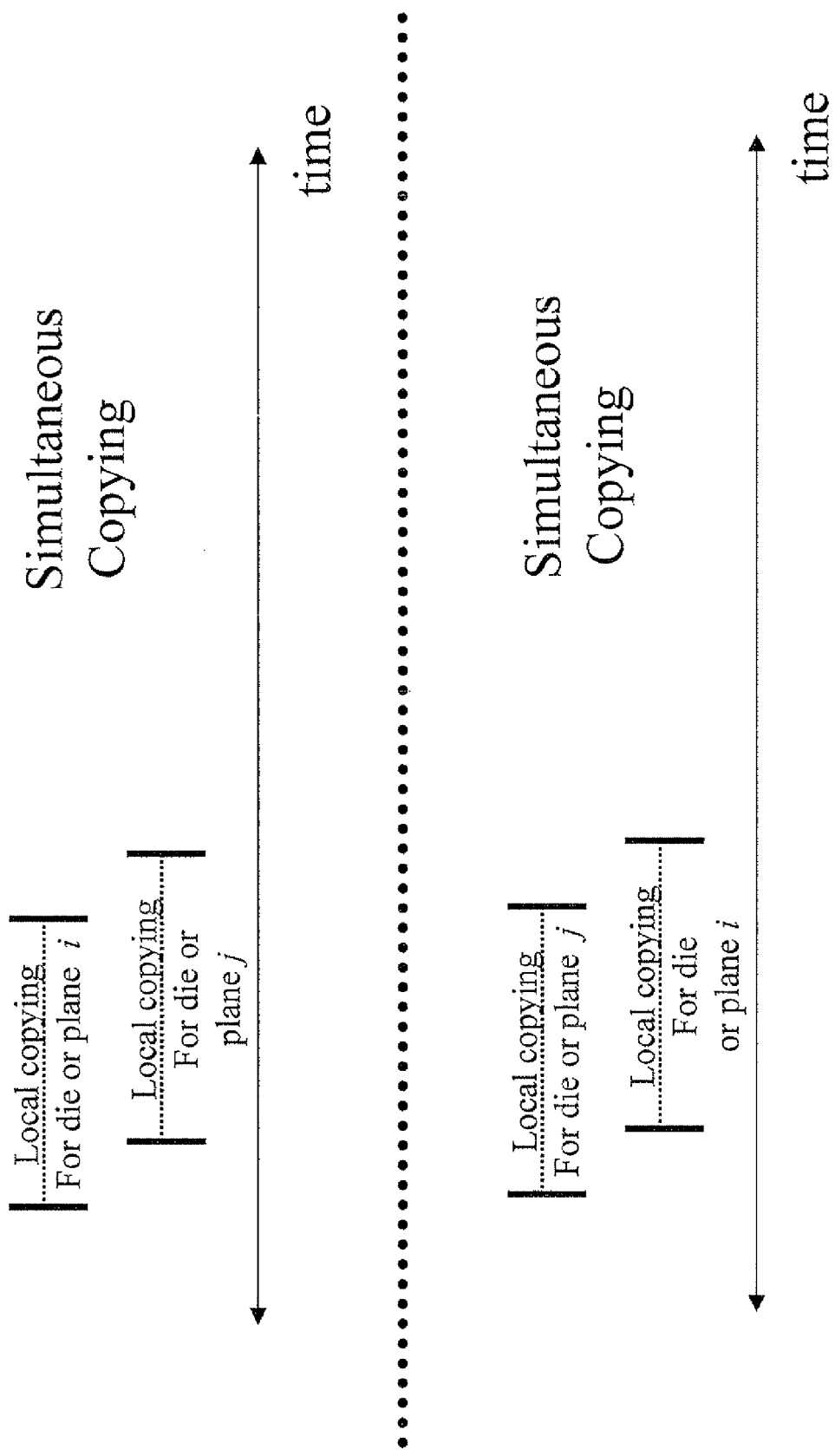
FIGS. 6A-6C illustrate various use cases related to simultaneous copying operations.
Figure 6B:
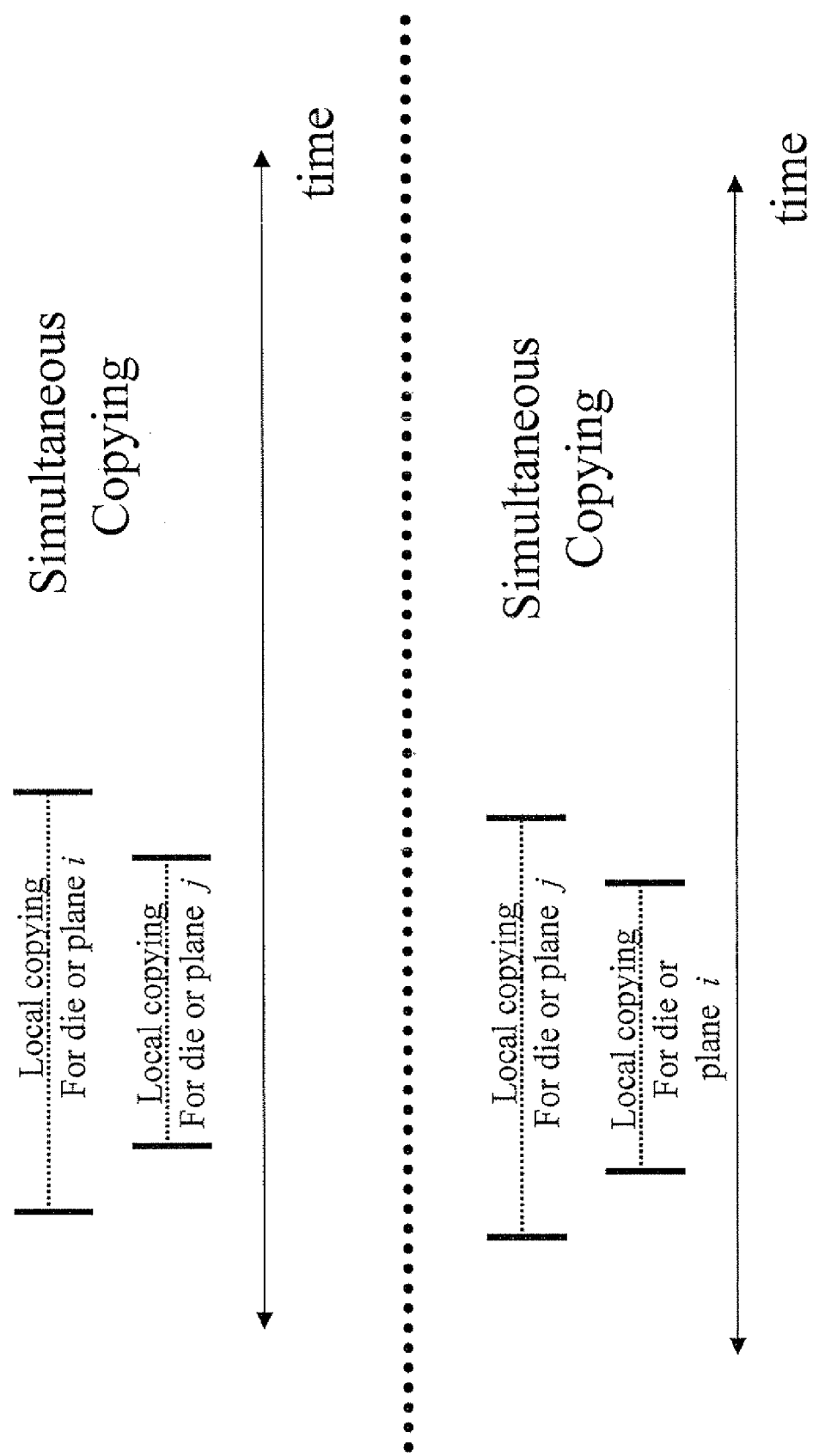
Figure 6C:
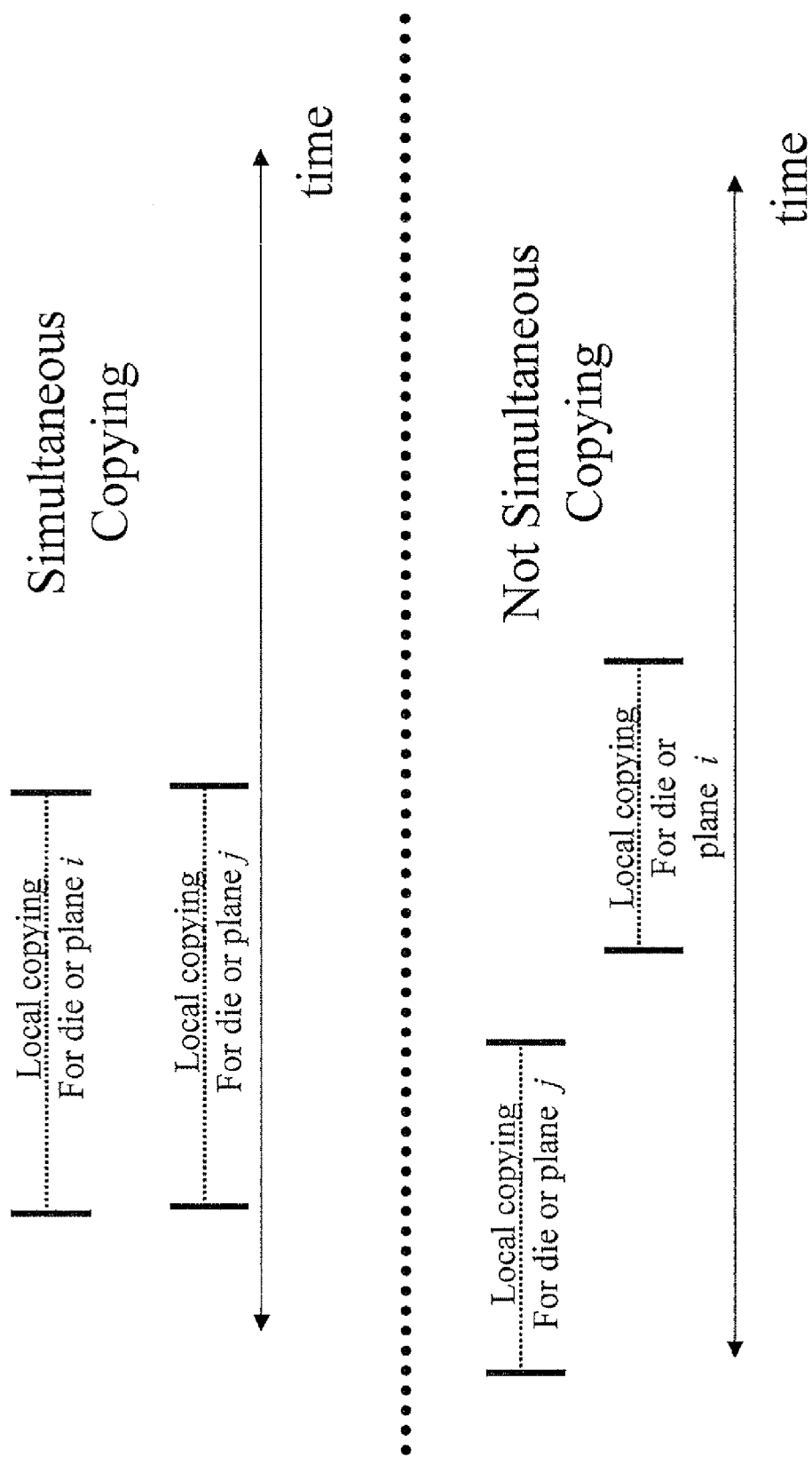

As illustrated in FIG. 6A-6C, for two local copyings on different dies (or in different memory planes as in routines illustrated in FIGS. 7-10) to be carried out "simultaneously," there needs to be at least partial temporal overlap between the times at which the copyings occur.

Figure 7:
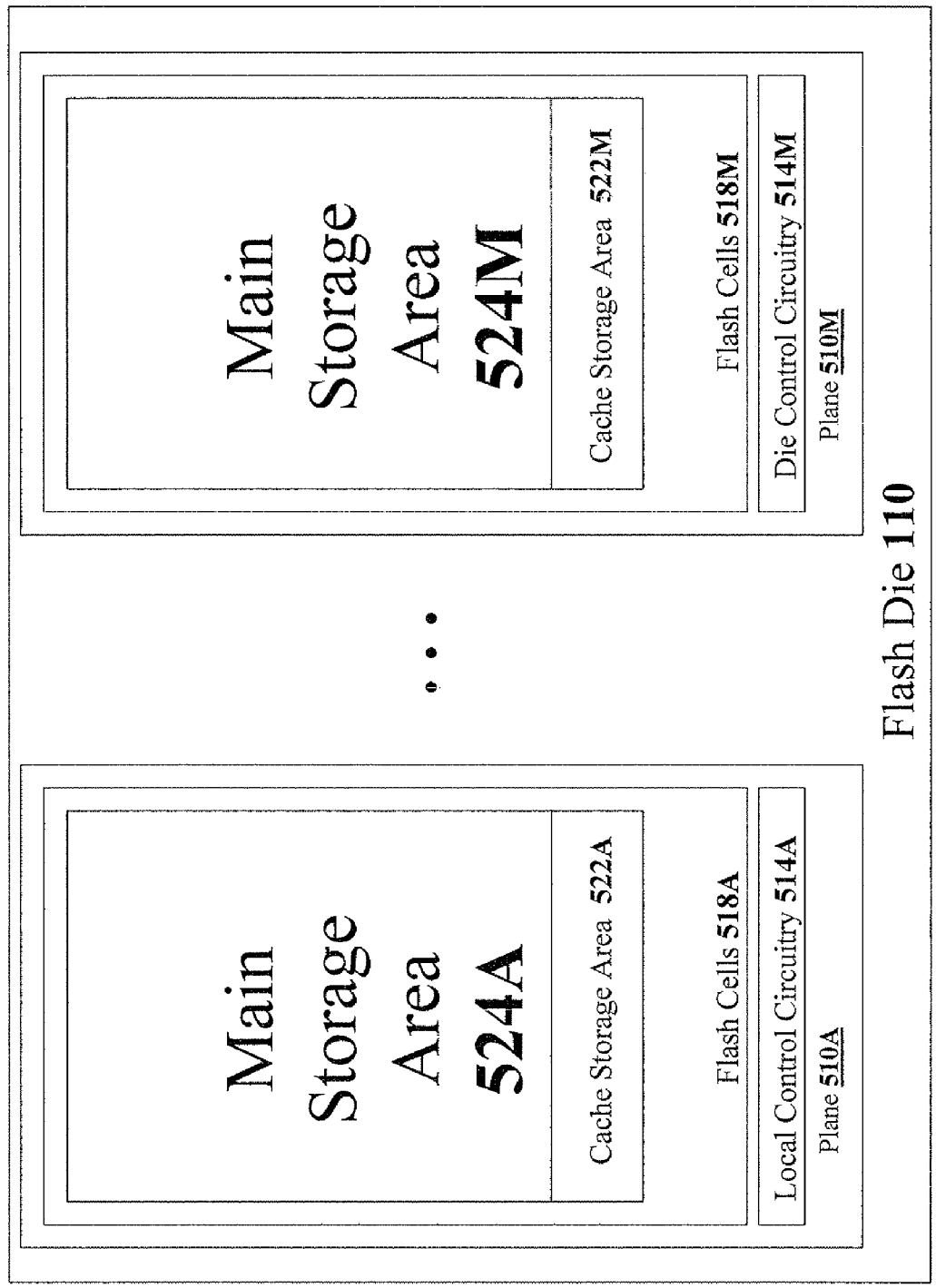
FIG. 7 is a block diagram of an exemplary flash memory die that includes a plurality of planes in accordance with some embodiments in accordance with some embodiments.

A Brief Discussion of FIG. 7

FIG. 7 is a block diagram of an exemplary flash memory die 110 including a plurality of flash memory planes 510 (i.e. M flash memory planes where M is an integer greater than or equal to two). In the non-limiting example of FIG. 7, each flash memory plane 110 includes respective flash cells 518 in which data may be stored and respective plane control circuitry 614. Plane control circuitry 514 may include any combination of hardware, firmware and/or software. In one particular example, plane control circuitry 514 may include dedicated read/write circuits (including, for example, a respective dedicated plane-local data bus) for programming data. Furthermore, it is appreciated that in some embodiments, flash memory die 110 may include additional planes 510 other than those illustrated in FIG. 7.

As illustrated in FIG. 7, each flash memory plane 510 includes a respective main storage area 524 and a respective cache storage area 522. The flash memory planes are configured within flash memory storage device 260 such that at least some 'incoming' data received from host device 310 via device-side port 250 is either (i) written first to one of the cache storage areas 522 (for example, in response to receiving the 'incoming' data from the host device 160) and then copied from the cache storage area 522 to one of the main storage areas 524; or (ii) written 'directly' to one of the main storage areas 524 without first being written to one of the cache storage areas.

Cache storage areas 522 and main storage areas 524 preferably provide the following features:

Feature A) each cache storage area 522k (i.e. k is a positive integer) is smaller (i.e. has less storage capacity) than a respective main storage area 524k co-residing on the same flash; and Feature B) each cache storage area 522k is configured to store data using a respective 'first writing speed mode' and each main storage area 524k is configured to store data using a respective 'second writing speed mode'—the respective 'first writing speed mode' of the respective cache storage area provides faster flash programming than the respective 'second writing speed mode.'

It is appreciated that "Feature A" and "Feature B" are per plane features, and do not require any relationship between, for example, a size and/or writing speed of a first plane and a size and/or writing speed of a second plane different from the first plane.

It is understood that when a "cache storage area" or a "main storage area" of a flash plane is "configured" to provide a specific feature (for example, configured to provide a given writing speed mode and/or configured to store a given number of bits per flash cell), that this feature may be provided by any element within flash memory device 260—for example, by flash controller 280 and/or flash memory 270 or any portion thereof). There is no requirement that the feature be provided exclusively by element(s) on the flash plane.

Thus, in one non-limiting example, the flash cells of the cache storage area 522 and the main storage 524 have a similar physical structure, but the flash controller 280 and/or the die control circuitry 114 and/or plane control circuitry 514 is configured: (i) to write data to the flash cells of the cache storage area 522 using a first writing mode associated with a first writing speed (for example, K bits per cell where K is a positive integer), and (ii) to write data to the flash cells of the main storage area 524 using a second writing mode associated with a second writing speed that is slower than the first writing speed (for example, L bits per cell where L is a positive integer that is greater than K). It is appreciated that other techniques for providing a "slower writing mode" and a "faster writing mode" may be used.

Thus, in some embodiments, each plane of the plurality of planes is configured such that the respective main storage area stores more bits per flash cell than the respective cache storage area.

Some Additional Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

In some embodiments, a flash die includes a plurality of "planes."

A "plane" of a flash die is a sub-array of cells of the flash die that can be written in parallel with another "plane" of the same flash die.

A "target plane" is a plane on which a main storage area (i.e. any of 524A . . . 524N) specified (i.e. either directly or indirectly) in the addressing information (i.e. therefore 'targeted' by the addressing information received from host 310) resides.

When data is copied from a cache storage area 522i of a first memory plane to a main storage area 522j of a second memory plane where i and j are positive integers that are not equal to each other this is referred to as a "inter-plane cache-data-transfer operation." One example of an 'inter-plane cache-data-transfer operation' is when (i) "incoming data" is initially written (e.g. written by flash controller 280 in response to the receiving of the 'incoming data' from host device 310) to cache storage area 522i of the first memory plane and (ii) subsequently, in the subsequent inter-plane cache-data-transfer operation, copied from cache storage area 522i of the first memory plane to main storage area 524j of the second memory plane.

When data is copied from a cache storage area 522i of a given memory plane to a main storage area 522i of the same memory plane where i is a positive integer, this is referred to as an "intra-plane cache-data-transfer operation." One example of an 'intra-plane cache-data-transfer operation' is when (i) "incoming data" is initially written (e.g. written by flash controller 280 in response to the receiving of the 'incoming data' from host device 310) to cache storage area 522i of the memory plane and (ii) subsequently, in the subsequent intra-plane cache-data-transfer operation, copied from cache storage area 522i of the memory plane to main storage area 524i of the same memory plane.

There is no requirement that the data be "locally" copied—i.e. copied in a manner such that the data remains on the particular plane of the 'intra-plane cache-data-transfer operation' en transit from the cache storage area 522i of the plane to the main storage area 524i . Thus, in one non-limiting example, flash controller 280 is on a "controller die" that is different from the flash memory dies 110, and the data is copied from the cache storage area 522i of the plane 510i to the main storage area 524i of the same plane 510i by the flash controller 280. In this non-limiting example, the data may reside, for example, in volatile memory (e.g. RAM or one or more register(s)) for some period of time en transit from the cache storage area 522i of the plane 510i to the main storage area 524i.

In a much preferable alternate example, the data is "locally copied" and does, in fact, remain on the particular plane 510i of the 'intra-plane cache-data-transfer operation' en transit from the cache storage area 522i of the plane 510i to the main storage area 524i . For example, the data may be "locally" copied by plane control circuitry 514i which co-resides in the same plane 510i as the cache storage area 522i and the main storage area 524i . In some embodiments, this alternate example may be much preferable because it may save controller resources or controller-flash bus bandwidth while copying data from cache area to main area. This allows concurrent cache copying operations to run in parallel in different planes (as further explained below), thus improving the storage system performance.

A Discussion of FIG. 8

FIG. 8 is a flow chart of an exemplary technique for enforcing a flash caching policy which permits intra-plane cache-data-transfer operations while forbidding inter-plane cache-data-transfer operations.

In step S611, incoming data that is associated with addressing information for the data is received into flash device 260 from host device 310—for example, as part of a write command.

In step S463, it is determined (for example, by the device controller 280) from the addressing information to which main storage area (i.e. one of 510A . . . 50N) the received data is addressed. By determining to which main storage area the storage area the received data is addressed, a flash plane of the M flash planes is specified.

As noted earlier, not all data is required to be cached to a cache storage area 522i before being stored in a main storage area 524i —only in some embodiments is this is the case. Thus, in the example of FIG. 8, it is determined whether or not data will be written to a cache storage area (i.e. one of 522A . . . 522N) before being written to a main storage area (i.e. one of 524A . . . 524N). In one non-limiting example, the decision of step S617 of whether or not to cache data may be carried out in accordance with a number of factors, for example, according to a rate in which data is received into the flash device 260 and/or in accordance with how fill the cache is and/or in accordance with an 'operating mode' of flash device 260 and/or in accordance with any other factor.

In the event that data is not going to be cached, the data is written in step S621 (for example, written from volatile storage within flash device 260) to the main storage area of the target plane specified directly or indirectly by the addressing information.

Otherwise, in the event that data is to be written into a cache storage area (i.e. one of 522A . . . 522N) before being written into a main storage area (i.e. one of 524A . . . 524N), then the data is written in step S619 to the cache storage area 522i (where i is a positive integer) which co-resides on the same "target plane" 510i as the main storage area 524i specified directly or indirectly in the addressing information for the data.

In some embodiments, the data is written to only one cache storage area 522i —the device is operative such that whenever the received data is written into a cache storage area 522 before being written into a main storage area 524, the received data is written to only one cache storage area 522i —i.e. only to the main storage area residing in the "target die" 510i . Thus, in these embodiments, the received data is not written to any other cache storage area 522j (where j is a positive integer that is not equal to i).

In step S621 (i.e. when step S621 is carried out after step S619), the data is copied in an 'intra-plane cache-data-transfer operation' from cache storage area 522i to main storage area 524i . By writing data, in step S619, into a cache storage area which co-resides on the same die as the main storage area specified (i.e. directly or indirectly) by the addressing information, it is possible to enforce a caching policy which allows intra-plane cache-data-transfer operations (i.e. in step S621 when this is executed after step S619 and when data is copied from cache storage area 522i to main storage area 524i ), and forbids inter-plane cache-data-transfer operations.

Figure 9A:
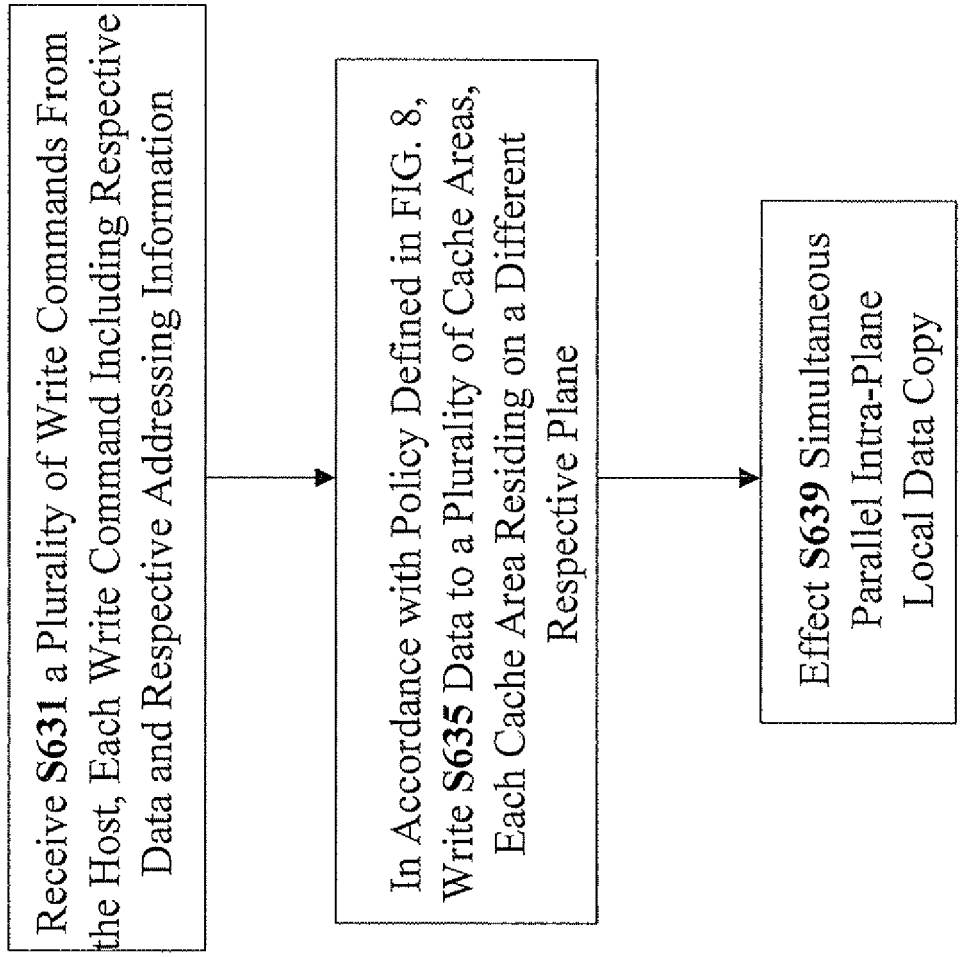
FIG. 9A is a flow chart of an exemplary routine for receiving data and effecting a simultaneous parallel intra-plane cache flushing operation.
Figure 9B:
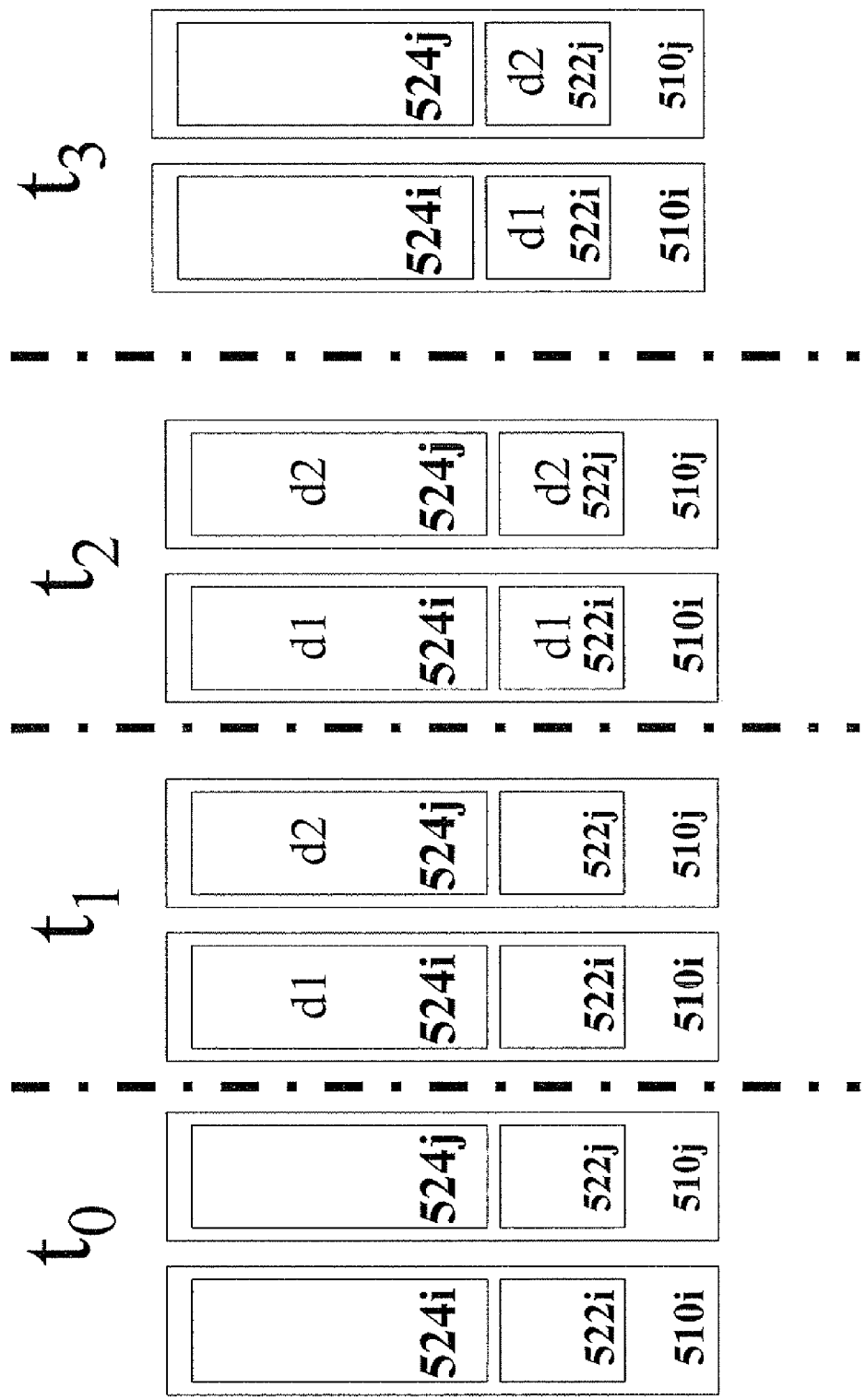
FIG. 9B illustrates a use case for the routine of FIG. 9A.

A Discussion of FIGS. 9A-9B

FIG. 9A is a flow chart of a routine where, over a period of time, different "chunks" of data are received, where each chunk is addressed to a particular main storage area residing on a particular target plane. One non-limiting example of how implementing the routine of FIG. 9A affects the contents of the flash memory planes is shown in FIG. 9B.

In FIG. 9B, to is a first point in time, t1 is a later point in time after t0, and t2 is a later point in time after t1, and t3 is a later point in time after t1. In the example of FIG. 9B, data d1 is addressed (i.e. according to addressing information received from host 310) to main storage area 524i on plane 510i, while data d2 is addressed to main storage area 524j on plane 510j, where i and j are positive integers that not equal to each other.

In the example of FIG. 9B, at a time after t0 and before t1, data d1 and d2 as well as the addressing information for data d1 and d2 are received into flash device 260 from host device 310. This may occur when flash device 260 receives a plurality of write commands from the host where each command includes respective data and respective addressing information as indicated in step S631 of FIG. 9A.

In step S635 shown in FIG. 9A, data received from host device 310 is written to a plurality of cache storage areas in accordance with the policy described in FIG. 8. Thus, whenever data is addressed to a given main storage area of the plurality of main storage areas 524A . . . 524M (i.e. residing on a 'target' plane), and whenever this data is cached to one of the cache storage areas 522A . . . 522M before being written to the main storage areas, the data is written (see step S619) to the cache storage area that co-resides in the same plane (i.e. the target plane) as the given main storage plane to which the data is addressed.

This may be seen in the example of FIG. 9B—because data d1 is addressed to main storage area 524i, data d1 is written at a time after t0 and before t1 to cache storage area 522i. Similarly, because data d2 is addressed to main storage area 524j, data d2 is written at a time after t0 and before t1 to cache storage area 522j.

In step S639, a simultaneous parallel intra-die cache local copying operation is carried out—i.e. a respective "locally copying" is carried out in each plane, where the local copyings for the different planes are carried out simultaneously.

The skilled artisan is referred to FIGS. 6A-6C (and accompanying discussion) which note that for two local copyings on different planes to be carried out "simultaneously," there needs to be at least partial temporal overlap between the times at which the copyings occur.

Figure 10:
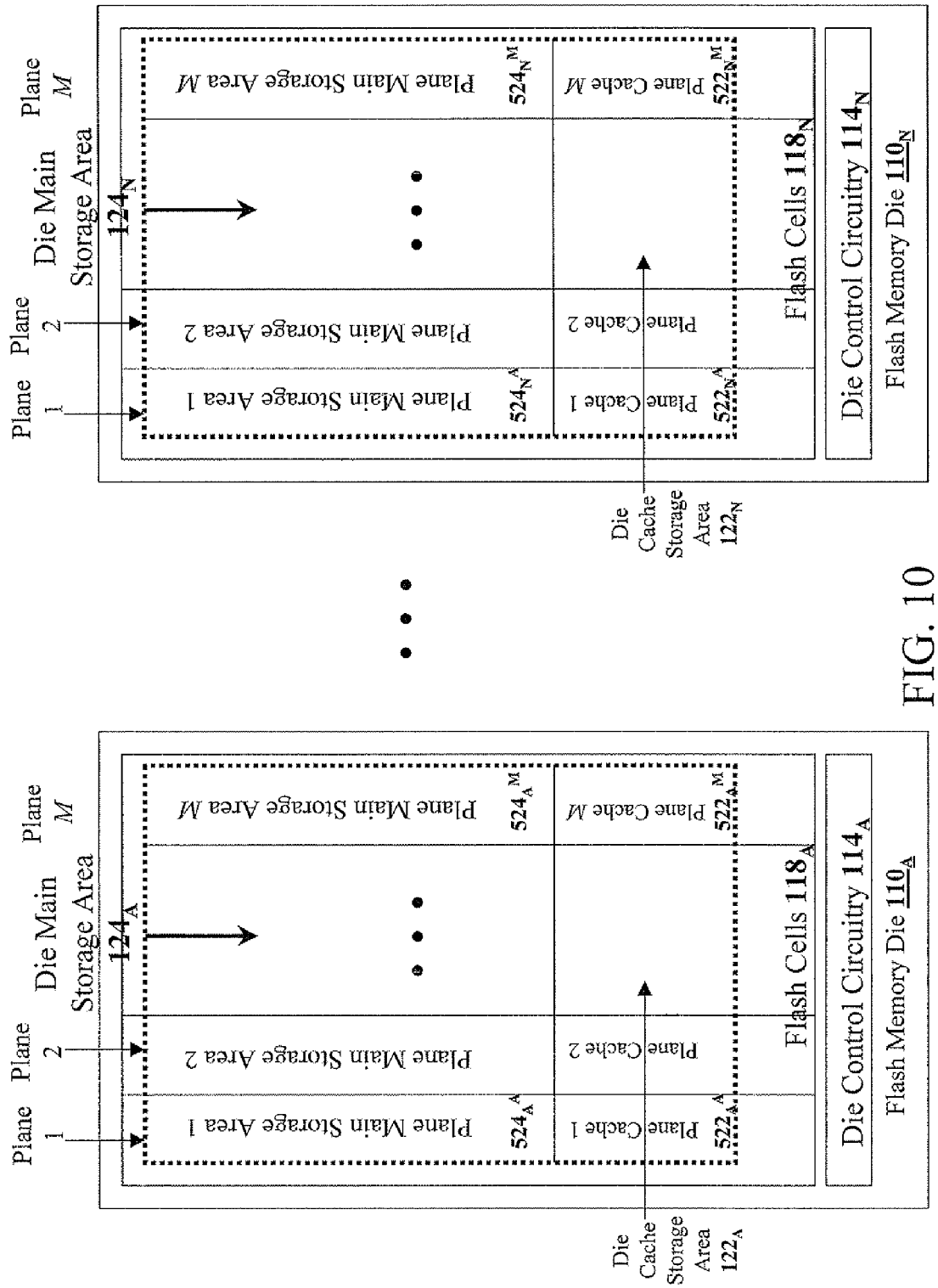
FIG. 10 is a schematic diagram of a flash memory die that includes a plurality of planes, where each plane includes a respective plane cache storage area and a respective plane main storage area.

A Discussion of FIG. 10

FIG. 10 is a block diagram of an array of N flash memory dies 110 where N is an integer greater than 1. In the example of FIG. 10, each flash die has M planes, where M is an integer greater than 1. According to the notation of FIG. 10, the subscript identifies the flash die (i.e. between 1 and N), while the superscript identifies the flash plane (i.e. between 1 and M.

In some embodiments, flash memory device 260 is operative to carry out the techniques of FIGS. 4 and 8 simultaneously—the device determines both to which die and to which plane within the die received data is addressed (i.e. see step S413 and S463) thereby specifying both a 'target die' $110_i$ (where i is an integer greater than or equal to 1 and less than or equal to N) and a 'target plane' $510_i^j$ (where j is an integer greater than or equal to 1 and less than or equal to M) within target die $110_i$, and enforces a policy such that both: (i) whenever the received data is written into a cache storage area 122 before being written into a main storage area $124_j$, the received data is written into the cache storage area $122_i$ of the specified target die $110_i$; and (ii) whenever the received data is written into a plane cache storage area $522_i^j$ before being written into a plane main storage area $524_i^j$, the received data is written into the plane cache storage area 522 of the specified target plane $510_i$ on the specified target die $110_i^j$.

It is noted that in the non-limiting example of FIG. 10, each flash die has the same number of planes (i.e. M planes). It is appreciated that this is not a limitation, and in some embodiments, each flash die has a respective number of flash planes $M_i$ where $M_i$ is a positive integer greater than 1, wherein at least two flash dies have different numbers of flash planes (i.e. there exist integers k and l where (i) k is not equal to l (ii) both k and l are greater than or equal to 1 and (iii) $M_k$ is not equal to $M_l$), and the techniques of FIGS. 4 and 8 are carried out simultaneously.

Additional Discussion

In different embodiments, the flash memory device may be configured to implement any routine described herein. In some embodiments, this is carried out, at least in part, using flash controller 280. Any flash controller 280 disclosed herein may be implemented using any combination of hardware (for example, including a microprocessor and optionally volatile memory such as RAM or registers), firmware and/or software (for example, computer code which is stored in volatile and/or non-volatile memory and is executable by a microprocessor). Controller 280 may include any software and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in controller 280 including but not limited to reduced instruction set computer (RISC) architecture and/or complex instruction set computer (CISC) architecture.

It is further noted that any of the embodiments described above may further include receiving, sending or storing instructions and/or data that implement the operations described above in conjunction with the figures upon a computer readable medium Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion

What is claimed is:

1. A flash memory device comprising:
   a plurality of flash memory dies, each flash memory die including a respective cache storage area and a respective main storage area; and
   control circuitry operative to:
      receive data from an external host device;
      determine a target die from the plurality of flash memory dies based on an address of the received data;
      determine whether the received data is to be written in the cache storage area of the target die or in the main storage area of the target die;

write the received data in the target die, wherein the received data is written in the cache storage area of the target die or the main storage area of the target die based on the determination; and whenever the received data is written into the cache storage area, transfer the received data from the cache storage area to the main storage area of the target die in an intra-die data transfer, wherein the received data does not leave the target die during the intra-die data transfer.

2. The device of claim 1 wherein the control circuitry is operative such that all data received from the external host device is written into the cache storage area before being written into the main storage area.

3. The device of claim 1 wherein the control circuitry is operative such that at least one received data from the external host device is written into the cache storage area before being written into the main storage area, while at least one received data from the external host device is written into the main storage area without first being written into the cache storage area.

4. The flash memory device of claim 1 wherein the respective main storage area is configured to store more bits per flash cell than the respective cache storage area.

5. The flash memory device of claim 1 wherein the control circuitry is operative to simultaneously carry out a plurality of intra-die transfers in more than one flash memory die from for the plurality of flash memory dies.

6. The flash memory device of claim 1 wherein the control circuitry includes at least one of software or firmware.

7. The flash memory device of claim 1 wherein each flash memory die of the plurality of flash memory dies includes a plurality of planes, each plane including a respective plane cache storage area and a respective plane main storage area; and wherein the control circuitry is further operative to:

determine a target plane within the target die based on the address; write the received data in the target plane in the plane cache storage area or the plane main storage area; and whenever the received data is written into the plane cache storage area, transfer the received data from the plane cache storage area to the plane main storage area.

8. A method of data caching in a system including a flash memory device coupled to an external host device, the flash memory device including a plurality of flash memory dies, each flash memory die including a respective cache storage area and a respective main storage area, the method comprising:

receiving data by the flash memory device from the external host device;

determining a target die from the plurality of flash memory dies based on an address of the received data;

writing the received data in the target die, wherein the received data is written in the cache storage area of the target die or the main storage area of the target die; and whenever the received data is written into the cache storage area, transferring the received data from the cache storage area to the main storage area of the target die in an intra-die data transfer, wherein the received data does not leave the target die during the intra-die data transfer.

9. The method of claim 8 wherein writing the received data further includes:

writing a first portion of the received data into the cache storage area of the target die; and writing a second portion of the received data into the main storage area of the target die without first writing the second portion into any cache storage area.

10. The method of claim 8, wherein the received data is written to the cache storage area, wherein writing the received data further includes writing the received data into the cache storage area using a first writing mode that provides a first number of bits per flash cell, wherein transferring the received data further includes writing the received data into the main storage area using a second writing mode that provides a second number of bits per flash cell that exceeds the first number of bits.

11. The method of claim 8, wherein the received data does not leave the target die during the intra-die data transfer.

12. The method of claim 11 further including: performing a plurality of intra-die transfers simultaneously for more than one flash memory dies from the plurality of flash memory dies.

13. The method of claim 8 wherein each flash memory die of the plurality of flash memory dies includes a plurality of planes, each plane including a respective plane cache storage area and a respective plane main storage area, the method further comprising:

determining a target plane within the target die based on the address;

writing the received data in the target plane in the plane cache storage area or the plane main storage area; and whenever the received data is written into the plane cache storage area, transferring the received data from the plane cache storage area to the plane main storage area.

14. A flash memory device comprising:

at least one flash memory die, the flash memory die including a plurality of planes, each plane including a respective cache storage area and a respective main storage area; and control circuitry operative to:

receive data from an external host device;

determine a target plane from the plurality of planes based on an address of the received data;

determine whether the received data is to be written in the cache storage area of the target plane or in the main storage area of the target plane;

write the received data in the target plane in the cache storage area of the target plane or the main storage area of the target plane based on the determination; and whenever the received data is written into the cache storage area, transfer the received data from the cache storage area to the main storage area of the target plane.

15. The flash memory device of claim 14 wherein the control circuitry is operative such that all data received from the external host device is written into the cache storage area before being written into the main storage area.

16. The flash memory device of claim 14 wherein the control circuitry is operative such that at least one received data from the external host device is written into the cache storage area before being written into the main storage area, while at least one received data from the external host device is written into the main storage area without first being written into the cache storage area.

17. The flash memory device of claim 14 wherein the respective main storage area is configured to store more bits per flash cell than the respective cache storage area.

18. The flash memory device of claim 14 wherein the received data does not leave the target plane while transferring the received data.

19. The flash memory device of claim 18 wherein
the control circuitry is operative to simultaneously transfer received data from the plane cache storage area to the plane main storage area in more than one plane from the plurality of planes.

20. The flash memory device of claim 14 wherein the control circuitry includes at least one of software or firmware.

21. A method of data caching in a system including a flash memory device coupled to an external host device, the flash memory device including at least one flash memory die, the flash memory die including a plurality of planes, each plane including a respective cache storage area and a respective main storage area, the method comprising:
receiving data by the flash memory device from the external host device;
determining a target plane from the plurality of planes based on an address of the received data;
determining whether the received data is to be written in the cache storage area of the target plane or in the main storage area of the target plane;
writing the received data in the target plane in the cache storage area of the target plane or the main storage area of the target plane based on the determination; and
whenever the received data is written into the cache storage area, transferring the received data from the cache storage area to the main storage area of the target plane.

22. The method of claim 21 wherein writing the received data further includes:
writing a first portion of the received data into the cache storage area of the target plane; and
writing a second portion of the received data into the main storage area of the target plane without first writing the second portion into any cache storage area.

23. The method of claim 21, wherein the received data is written to the cache storage area, wherein writing the received data further includes writing the received data into the cache storage area using a first writing mode that provides a first number of bits per flash cell, wherein transferring the received data further includes writing the received data into the main storage area using a second writing mode that provides a second number of bits per flash cell that exceeds the first number of bits.

24. The method of claim 21, wherein the received data does not leave the target plane during the transferring.

25. The method of claim 24 further including:
transferring simultaneously data from the cache storage area to the main storage area in more than one plane from the plurality of planes.

26. A non-transitory computer readable medium having stored therein computer readable program code for data caching in a system including a flash memory device coupled to an external host device, the flash memory device including a plurality of flash memory dies, each flash memory die including a respective cache storage area and a respective main storage area, the program code being operable to:
receive data by the flash memory device from the external host device;
determine a target die from the plurality of flash memory dies based on an address of the received data;
determine whether the received data is to be written in the cache storage area of the target die or in the main storage area of the target die;
write the received data in the target die, wherein the received data is written in the cache storage area of the target die or the main storage area of the target die based on the determination; and
whenever the received data is written into the cache storage area, transfer the received data from the cache storage area to the main storage area of the target die in an intra-die data transfer, wherein the received data does not leave the target die during the intra-die data transfer.

27. A non-transitory computer readable medium having stored therein computer readable program code for data caching in a system including a flash memory device coupled to an external host device, the flash memory device including at least one flash memory die, the flash memory die including a plurality of planes, each plane including a respective cache storage area and a respective main storage area, the program code being operable to:
receive data by the flash memory device from the external host device;
determine a target plane from the plurality of planes based on an address of the received data;
determine whether the received data is to be written in the cache storage area of the target plane or in the main storage area of the target plane;
write the received data in the target plane in the cache storage area of the target plane or the main storage area of the target plane based on the determination; and
whenever the received data is written into the cache storage area, transfer the received data from the cache storage area to the main storage area of the target plane.

28. The device of claim 1 wherein the determination whether the received data is to be written in the cache storage area is based in one or more factors selected from a group consisting of rate at which data is received into the flash memory device, or an amount of free space in the cache storage area.

* * * * *